United States Patent [19]

Sposato et al.

[11] Patent Number: 5,682,511
[45] Date of Patent: Oct. 28, 1997

[54] GRAPHICAL VIEWER INTERFACE FOR AN INTERACTIVE NETWORK SYSTEM

[75] Inventors: Jonathan N. Sposato, Isaquah; Jon B. Kimmich, S.E. Bellevue; Jeffrey Aaron Lubetkin, Seattle, all of Wash.

[73] Assignee: Microsoft Corporation, Redmond, Wash.

[21] Appl. No.: 437,010

[22] Filed: May 5, 1995

[51] Int. Cl.$^6$ .............................. G06F 3/14; H04N 7/173
[52] U.S. Cl. .................. 395/353; 395/357; 395/328; 395/327; 348/10; 348/13
[58] Field of Search .................................. 395/353, 357, 395/328, 327, 352, 340, 348, 356, 970; 348/7, 10, 12, 13

[56] References Cited

U.S. PATENT DOCUMENTS

| | | | |
|---|---|---|---|
| 4,896,291 | 1/1990 | Gest et al. | 395/353 |
| 5,237,648 | 8/1993 | Mills et al. | 395/328 X |
| 5,485,197 | 1/1996 | Hoarty | 395/353 X |
| 5,524,195 | 6/1996 | Clanton, III et al. | 395/327 |
| 5,559,549 | 9/1996 | Hendricks et al. | 348/12 X |
| 5,559,945 | 9/1996 | Beaudet et al. | 395/353 |
| 5,619,249 | 4/1997 | Billock et al. | 348/7 |

Primary Examiner—Raymond J. Bayerl
Attorney, Agent, or Firm—Jones & Askew, LLP

[57] ABSTRACT

A graphical viewer interface appropriate for children's programming provided through an interactive television system for running programs ordered by the viewer. The inventive system includes a method for displaying on a television screen a plurality of control items including a character window, an episode window, an order button, and a scram button, wherein the viewer may navigate the focus among the various control items by manipulating a remote control. The viewer browses among options, and orders options for viewing using a handheld remote control. The character window displays one among a plurality of cartoon characters. The episode window displays a scene from one among a plurality of cartoon episodes within a category of cartoon episodes featuring the character displayed in the first window. The scene displayed in the second window is a single frame from the cartoon episode depicting a "key defining moment" that differentiates the selected cartoon from all other cartoons featuring the same character. The viewer orders a cartoon episode for viewing by first selecting a desired character using the character window, then selecting a desired episode using the episode window, and then selecting and executing the order button.

24 Claims, 16 Drawing Sheets

Fig_9

| | Character ID | Character | Character Still |
|---|---|---|---|
| 302a | 1 | SCUZZ | C:\BMP\SCUZZ.BMP |
| 302b | 2 | DIGGER | C:\BMP\DIGGER.BMP |
| 302c | 3 | HOPPER | C:\BMP\HOPPER.BMP |
| 302d | 4 | ORBY | C:\BMP\ORBY.BMP |
| 302e | 5 | ROVER | C:\BMP\ROVER.BMP |
| ⋮ | ⋮ | ⋮ | ⋮ |
| 302n | | | |

FIG. 10

| Cartoon ID | Cartoon Name | Character 1 ID | Character 2 ID | Character 3 ID | Still File |
|---|---|---|---|---|---|
| 1 | Scuzz Awash | 1 | 2 | 6 | C:\BMP\SCUZZ AW.B |
| 2 | Say Cheeze | 2 | 1 | 0 | C:\BMP\SAY CHEEZE. |
| 3 | Roller Ball | 1 | 6 | 0 | C:\BMP\ROLLR BAL.B |
| 4 | Reptile Rummie | 11 | 0 | 0 | C:\BMP\REPTLE RU.B |
| 5 | Beach Bum | 4 | 5 | 0 | C:\BMP\BEAC BUM.B |

FIG. 11

GRAPHICAL VIEWER INTERFACE FOR AN INTERACTIVE NETWORK SYSTEM

TECHNICAL FIELD

The present invention relates generally to a user interface for an interactive network and, more particularly, to a graphical viewer interface for an interactive television system.

BACKGROUND OF THE INVENTION

Cable television systems, sometimes referred to as community-antenna television (CATV) systems, are broad band communications networks of coaxial cable and optical fiber that distribute video, audio, and data signals to the homes or businesses of subscribers. In a typical CATV system, a single advantageously located antenna array feeding a cable network supplies each individual subscriber with a usable television signal.

CATV networks have experienced enormous growth and expansion in the United States, particularly in urban areas. It is estimated that CATV networks currently pass near and are accessible to approximately 90% of the population in the United States, with approximately 60–65% of all households actually being connected to such communications networks. While cable systems originally had very simple architecture and provided a limited number of different television signals, the increase in the number of television broadcasters, owners, and services over the last several decades has resulted in much more complex modern cable distribution systems.

A typical CATV system for the delivery of television programming to subscribers comprises three main elements: a headend, a distribution system, and subscriber drops.

The "headend" is a signal reception and processing center that collects, organizes and distributes signals. The headend receives satellite-delivered video and audio programming, over-the-air broadcast television station signals, and network feeds delivered by terrestrial microwave and other communication systems. In addition, headends may inject local broadcast programming into the package of signals sent to subscribers, such as commercials and live programs created in a television studio.

The "distribution system" carries the signals from the headend to a number of distribution points in a community and, in turn, distributes the these signals to individual neighborhoods for delivery to subscribers. A modern distribution system typically comprises a combination of coaxial cable and optical fibers with trunk amplifiers periodically spaced to compensate for attenuation of the signals along the line.

"Subscriber drops" are taps in the distribution system that feed individual 75 Ω coaxial cable lines into subscribers' television sets or subscriber set-top terminals, often referred to as "subscriber premises equipment" or "customer premises equipment" ("CPE").

CATV distribution systems were originally designed to distribute television signals in the "downstream" direction only, i.e., from a central headend location to multiple subscriber locations, also referred to as the "forward" path. For downstream transmissions, typical CATV systems provide a series of video channels, each 6 MHz in bandwidth, which are frequency division multiplexed across the forward band, in the 50 MHz to 550 MHz region of the frequency spectrum. As optical fiber more deeply penetrates the service areas with hybrid optical fiber/coaxial cable (HFC) configurations, the bandwidth of the coaxial cable portion is expected to increase to over 1 GHz, thereby increasing the number of available channels for potential services.

The advent of pay-per-view services and other interactive television applications has fueled the development of bi-directional or "two-way" cable systems that also provide for the transmission of signals from the subscriber locations back to the headend via an "upstream" direction or a "reverse" path. By upgrading CATV systems employing relatively limited bandwidth coaxial cable with broad band distribution networks having HFC configurations, multiple service operator (MSOs) can use the additional channels gained by this wider bandwidth network to provide many new subscriber services. This ever-expanding deployment of fiber optic technology supports the implementation of an "interactive network" to allow a subscriber to obtain desirable service of programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Video on Demand such as movies on demand and cartoons on demand, interactive computing, shopping, entertainment, and other related services.

In an interactive network supporting interactive television services, this bi-directional communications medium combines aspects of television technology with computer technology. An interactive television system will superimpose, upon a traditional television display, a number of "control items" representing television service functions that may be selected and executed by the viewer. A control item is said to be "selected" and to have the "focus" when it is in a state enabled to receive commands from the user via the user input device. A "focus indicator" may be displayed on the screen in association with the control item having the focus. The viewer "selects" a control item by navigating the focus indicator to the desired control item. Selection and subsequent execution of a control item by a viewer may cause an "action command" to be transmitted from the viewer to the headend. For example, a viewer may order goods, select programming, or respond to an interactive program through execution of control items. Therefore, the primary distinction between traditional television programs and interactive television services is the ability of the viewer to send commands upstream via the distribution network to the headend, thus making the television system "interactive."

The delivery of a variety of interactive services via a broad band network distribution system raises the critical issue of defining an efficient mechanism for presenting both operation and content related information to an audience of possible consumers representing diverse technological backgrounds and interests. The "user interface" for an interactive network should appeal to a "typical viewer" of standard broadcast television programs and should be easy for this mythical person to understand and to use. Because computer users reflect only a portion of the overall audience for interactive television services, it is desirable that the features of this user interface be based upon the assumption that the typical viewer is not familiar with user interface customs that are otherwise acceptable and understood by the computer literate community. In particular, some viewers may have little or no computer background, and may be unfamiliar with traditional computer graphical user interfaces. For example, some viewers may be children. Therefore, there is a need for a viewer interface for an interactive network system capable of communicating useful information to a viewer who is otherwise unfamiliar with computer protocols or interactive services.

Typically, viewers of an interactive television service will be located several feet or even several yards away from a display screen presenting the service. Thus, displayed items of the viewer interface should be readily readable from an acceptable viewing distance that typically separates the viewer from a television screen. In view of this separation of the viewer and the display screen, it is also desirable that displayed control items representing service control functions be controllable with an input device familiar with this typical television viewer, such as a handheld remote control. However, this remote control may have significantly less communication capability than a keyboard and mouse system used on conventional computer systems. Thus, there is need for an interactive network system that provides a simplified display mechanism, and a highly effective means for communicating control information to the viewer.

In the computer industry, a graphical user interface (GUI) system is typically used to supply information, including control items and focus indicators, to users of computer systems. However, the conventional features of a graphical user interface for a conventional computer are not readily transferable for use by viewers in an interactive network system. A different "graphical viewer interface" is preferred for use in such an interactive network system.

A "graphical viewer interface" as used herein is a user interface specially designed for use in an interactive television system, and is therefore a special type of "graphical user interface," as that term is understood by those skilled in the computer arts. It is noted at this juncture that the terms "graphical user interface" and "GUI," which are commonly used in connection with computer environments, and "graphical viewer interface" and "GVI" are sometimes used interchangeably. It should be understood that features of one environment can sometimes, but not always, be used in the other environment.

In the environment of a conventional computer system, the entire display screen is available for providing information to the user via a GUI. On the other hand, there is a limited portion of a display screen that can be safely used in a consistent manner for presenting information to the viewer via a GVI for an interactive television system. In addition, the user of a conventional computer system usually sits very close to the screen, perhaps only a few feet away, and therefore can read relatively small print on the computer screen. In contrast, viewers of an interactive television system are typically separated from the display screen by a much greater distance. Moreover, users of conventional computer systems are typically computer literate and willing to resort to a written manual or on-line help service to gain more information on how to use the system. Viewers of interactive television systems, on the other hand, may be much less likely to be sophisticated in the use of computer systems, and far less likely to resort to the use of a manual or on-line help service to determine how to use the system.

In addition, there are problems associated with attempting to directly transfer conventional computer GUI techniques for use in an interactive television environment. First, a keyboard or mouse is typically required to navigate amongst a plurality of control items and perform the single- and double-click functions necessary to change the focus and execute items holding the focus in conventional computer GUI systems. In contrast, for an interactive television environment, the viewer will typically use a handheld remote control that generally supports only a limited set of commands, such as a "directional thumbpad" for generating directional navigation commands, and an "action button" for generating action commands.

More specifically, a handheld remote control unit may only have a single "action button" used to execute a function associated with a control item. If there are a plurality of control items displayed on the screen, it is generally appropriate that only a single control item have the focus, and thus be enabled to receive the action command if the action button is pressed. Changing the focus from one control item to another one requires a different sort of action appropriate for navigating the focus. A single directional thumbpad on the remote control generally provides this function. Therefore, the mouse button-click method used in conventional GUI systems for indicating a viewer's desire to change focus is not directly applicable to an interactive television environment.

Second, the methods of communicating content related information associated with programming information available for selection by a user through execution of a control item in a conventional computer environment may be insufficiently communicative in an interactive network environment. In a conventional computer system, users are generally familiar with the content of programming information available for selection through the GUI. This is because the user is typically the person who has selected and installed the programming information available for selection through the GUI. Therefore, a simple icon or symbol is sufficient to identify a selectable programming information item. Users requiring additional content related information are expected to resort to the manual provided with the programming information item or a text based on-line help service.

In contrast, simply displaying an icon or symbol associated with a control item may not convey enough content related information to enable the typical interactive television viewer to make an informed selection of programming information. This because the programming information provider, not the viewer, has typically selected the programming information items available for selection by the viewer in an interactive television system. For example, a programming information provider will typically decide which movies are available through a movies on demand service, which cartoons are available through a cartoons on demand service, which sound tracks are available through a music on demand service, etc. It is noted at this point that in some aspects of an interactive network system, viewers may play a significant role in choosing programming information available for selection, for example by customizing programming information selection menus, or by subscribing to a service that provides selection menus. Nevertheless, because many viewers will not have participated significantly in selecting items to be included on programming information selection menus, it is desirable that the interactive network system have a effective method for communicating content related information to viewers that are unfamiliar with the content of programming information available for selection.

Text-based resources such as printed manuals and on-line help services are typically used in conventional computer systems to provide users with supplemental content related information regarding programming information. Providing supplemental content related information in a text-based format may be ineffective for certain interactive television applications. For example, programs intended for use by children cannot rely on text based information to provide supplemental content related information.

Traditional text-based methods of presenting content related information to viewers are particularly inadequate in a cartoons on demand context, where children are the typical viewers, for several reasons. First, many children cannot read quickly enough or with a sufficient vocabulary to be responsive to text based information. Second, many of those children that read well enough to used text-based resources may have very short attention spans, and may therefore be unable or unwilling to use text-based resources. Third, children typically require very simple navigation modes within an interface and may therefore be unable to navigate successfully through a typical manual or on-line help service. Fourth, cartoon character names and the titles of individual cartoon episodes are not effective selection tools because children often forget character names and do not ordinarily associate the title of a cartoon episode with its content. Fifth, a cartoon catalog must contain a large amount of content related information because individual cartoon episodes are generally relatively short.

In view of the foregoing, it will be appreciated that the use of control items including visual images and/or audio cues connoting the content of items available for selection by the viewer would be highly desirable for leading a viewer through the various control and selection operations of an interactive network system. For example, there is a need for a system of visual items and sounds that convey information to the viewer regarding the operation of the interface and the content of the items available for selection by the viewer.

In particular, there is a need for an interface for children's programming in which simple and entertaining visual images and/or sounds connote the content of the programs available for selection, and convey control information regarding the operation of the interface. The methods for manipulating the interface to browse among available programs, and for selecting and ordering a particular program for viewing, must be evident from the information presented by the interface itself, and must be simple enough for a child to use. Screen displays must be entertaining, and selection menus must be short, to accommodate the short attention spans of children.

In summary, for an interactive television environment, there is a need for a viewer interface having controls that are optimized in both appearance and behavior for operation by typical television viewers. The control functions of the viewer interface are preferably operable with a handheld input device, such as a remote control. It is desirable that these control functions be easily manipulated by viewers using the input device. It is further desirable that the operation of these control functions, and the content of the items available for selection, be readily understood by viewers based on the information presented by the interface. These needs are magnified with respect to children's programming.

SUMMARY OF THE INVENTION

The present invention addresses the need within the interactive network environment for an improved viewer interface by providing a graphical viewer interface, displayed on an output device and manipulated via viewer interaction with an input device, in which control and focus items are presented to the viewer that include pictorial images and/or sound cues that convey information relating to the operation of the interface and the content of the items available for selection. The present invention provides an interface for an interactive network system suitable for a wide variety of programming information including but not limited to cartoons on demand, movies on demand, music on demand, radio, broadcast print, audio, games, computer software including program modules such as application programs and operating systems, and other combinations of audio, video and/or computer software. Accordingly, it will be understood that programming information generally includes presentation information transmitted electronically to entertain, instruct, educate, or inform the recipient, as well as executable computer software including application programs and operating systems. It will be further understood that programming information includes program modules that support interactive services, along with presentation information such as control items and focus items that are used to control the interactive services.

The preferred embodiments are directed to an interface appropriate for children's programming provided through an interactive television system. In the preferred embodiments, the interactive network system is an interactive television system. The interactive service selected by the viewer is a cartoons on demand programming information service. The typical viewer is a child between 6 and 12 years of age. The output device is a television coupled to the interactive television set-top terminal. The user input device is a handheld remote control device coupled to the interactive television set-top terminal. The control items presented to the viewer on the viewer interface include windows, arrows, buttons, labels, and focus indicators that convey information to the viewer regarding the operation of the interface. The interface presented to the viewer includes pictorial images connoting the characters and scenes associated with the various cartoon episodes available for selection by the viewer.

More particularly described, the preferred embodiment of the present invention provides, in an interactive television system for running programs selected by the viewer, a method of displaying on the television screen a plurality of control items including a first window, a second window, a first button, and a second button, wherein the viewer may navigate the focus among the various control items by manipulating a remote control. A focus indicator is displayed including visual and sound cues. The focus may appear in a variety of forms such as a highlight ring around, or a change in appearance of, a control item. The focus indicator may have associated sounds such as a sliding sound followed by a "doink" sound played in association with a change in focus. A viewer navigates the focus, i.e., moves the focus from one control item to another, by imparting left or right directional commands from the remote control.

The first window is a "character window." The character window includes a category identification item that includes a pictorial image displaying one among a selectable plurality of cartoon characters. The viewer may change the cartoon character displayed in the character window by first navigating the focus to the character window, and then imparting up or down directional commands from the remote control. The character available for selection may thus be sequenced, as if on a wheel or ROLODEX card file. For example, the sequence of characters displayable in the character window might include SCUZZ, DIGGER, HOPPER, ORBY, ROVER, etc. etc. When the viewer navigates the focus off of the character window, the character last displayed remains in the character window.

The second window is an "episode window." The episode window includes an option identification item that includes a pictorial image including a scene from one among a selectable plurality of cartoon episodes involving the character displayed in the character window. The scene displayed is typically a single frame from the episode depicting a "key defining moment" that distinguishes that episode from all other episodes involving the same character. For example, the episode wherein SCUZZ rides a water scooter is depicted by a memorable frame from the episode with SCUZZ engaged in riding the water scooter. Thus, a viewer may recall the specific episode based on the content of episode window.

The viewer may change the cartoon episode depicted in the episode window by first navigating the focus to the episode window, and then imparting up or down directional commands from the remote control. The episodes available for selection may thus be sequences, as if on an wheel or ROLODEX card file. When the viewer navigates the focus off of the episode window, the scene last displayed remains in the episode window. When the viewer navigates the focus to the character window and then sequences through the characters available for selection, the episode window displays a stylized static image, indicating there is no episode currently selected.

The first button is an "order button." The order button includes the word "order" in stylized letters displayed in association with a picture of a button. A highlighting "focus ring" is displayed around the perimeter of the order button, or the order button becomes illuminated when holding the focus. The viewer orders the cartoon episode displayed in the episode window by first navigating the focus to the order button and then depressing the action key on the remote control. The ordered episode is then transmitted from the headend to the set-top terminal and displayed to the viewer on the television. Additional steps may be required before the episode is transmitted such as a step requiring the viewer to confirm the selection.

The second button is a "scram button." The scram button includes the word "scram" in stylized letters displayed in association with a picture of a button. A highlighting "focus ring" is displayed around the perimeter of the scram button, or the scram button becomes illuminated when holding the focus. The viewer ends the cartoons on demand application by first navigating the focus to the scram button and then depressing the action key on the remote control. Executing the scram button returns the viewer to a higher level interface associated with the interactive television system, such as an electronic program guide from which the viewer may select among a plurality of interactive services. Additional steps may be required before a cartoons on demand session is ended such as a step requiring the viewer to confirm the command to end the session.

According to an alternative embodiment of the present invention, the viewer interface for the cartoons on demand application includes a second character window. In this alternative, the viewer first selects a primary cartoon character displayed in the first character window, and then selects a secondary cartoon character displayed in the second character window. The episode window will than be operable for sequencing through episodes involving both the primary and secondary characters. This feature allows for sub-categorization of the cartoons available for selection, thus limiting the number of episodes available under a particular character selection.

Accordingly, it is an object of the present invention to provide a graphical viewer interface for an interactive television system appropriate for display on an ordinary television screen and used in connection with video on demand and particularly cartoons on demand.

It is another object of the present invention to provide a graphical viewer interface for an interactive television system that is easily manipulated by a viewer through interaction with a handheld remote control.

It is another object of the present invention to provide a graphical viewer interface for an interactive television system wherein control information relating to the operation of the interface may be readily understood by the viewer based on the information presented by the interface.

It is another object of the present invention to provide a graphical viewer interface for an interactive television system wherein the content of the items available for selection by the viewer may be readily understood by the viewer based on the information presented by the interface.

It is another object of the present invention to provide a graphical viewer interface for an interactive television system wherein control information relating to the operation of the interface may be readily understood by a viewer who is a typical child between the ages of 6 and 12, based on the information presented by the interface.

It is another object of the present invention to provide a graphical viewer interface for an interactive television system wherein the content of the items available for selection by the viewer may be readily understood by a viewer who is a typical child between the ages of 6 and 12, based on the information presented by the interface.

It is another object of the present invention to provide a graphical viewer interface for a cartoons on demand application for an interactive television system that allows the viewer to select a cartoon for viewing by presenting the viewer with a first window displaying one among a selectable plurality of cartoon characters, and a second window displaying a scene from one among a selectable plurality of cartoon episodes involving the character displayed in the first window.

It is another object of the present invention to provide a graphical viewer interface for a cartoons on demand application for an interactive television system that allows the viewer to select a cartoon for viewing by presenting the viewer with a first window displaying one among a selectable plurality of primary cartoon characters, and a second window displaying one among a selectable plurality of secondary cartoon characters, and a third window displaying a scene from one among a selectable plurality of cartoon episodes involving both the primary cartoon character displayed in the first window and the secondary cartoon character displayed in the second window.

These and other objects, features, and advantages of the present invention may be more clearly understood and appreciated from a review of the following detailed description and by reference to the appended drawings and claims.

BRIEF DESCRIPTION OF THE DRAWING FIGURES

FIG. 5 consisting of FIGS. 5A–5H, shows various display states of the illustrative interface for a cartoons on demand interactive television application.

Figure 6A:
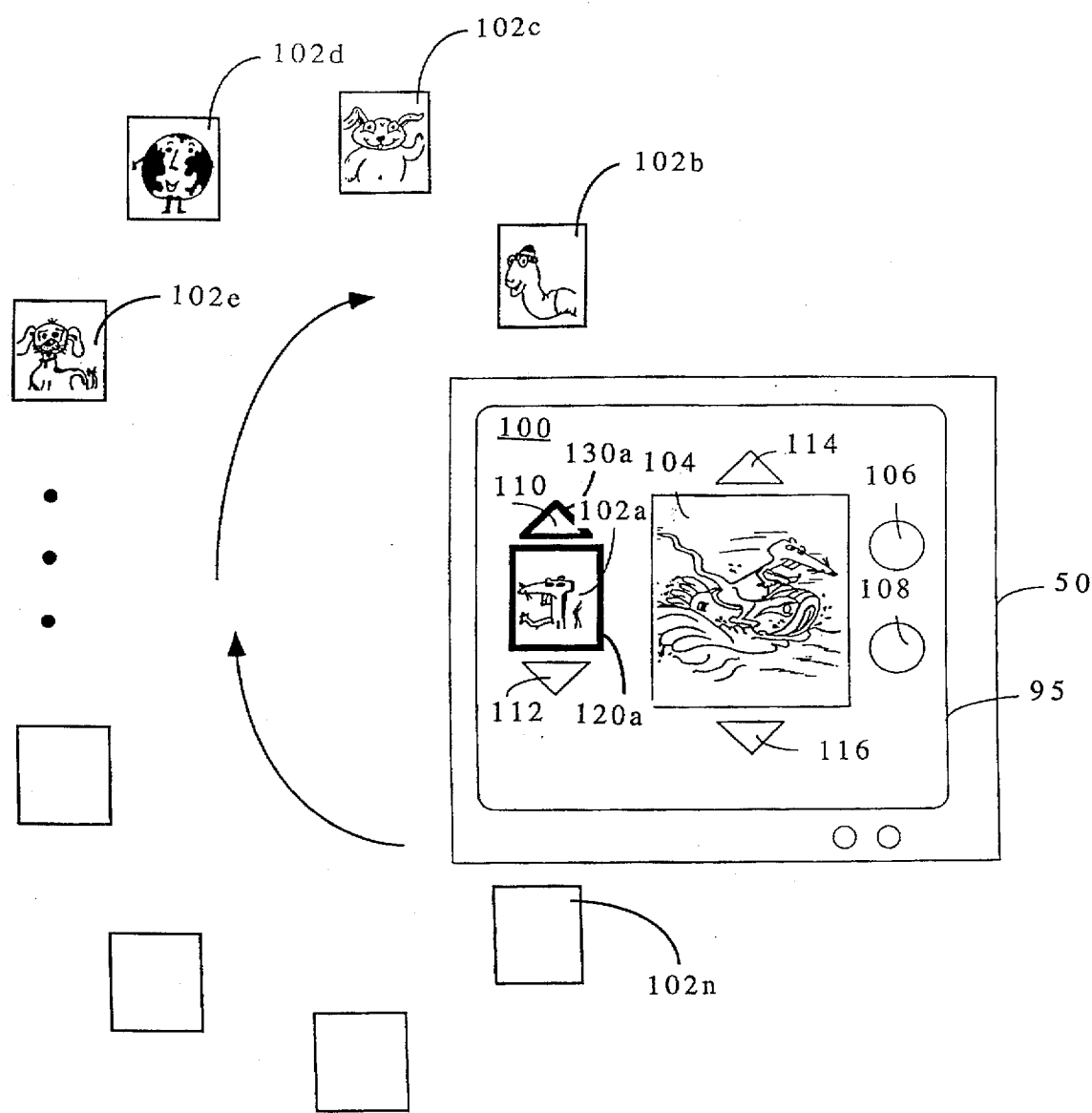
Figure 6B:
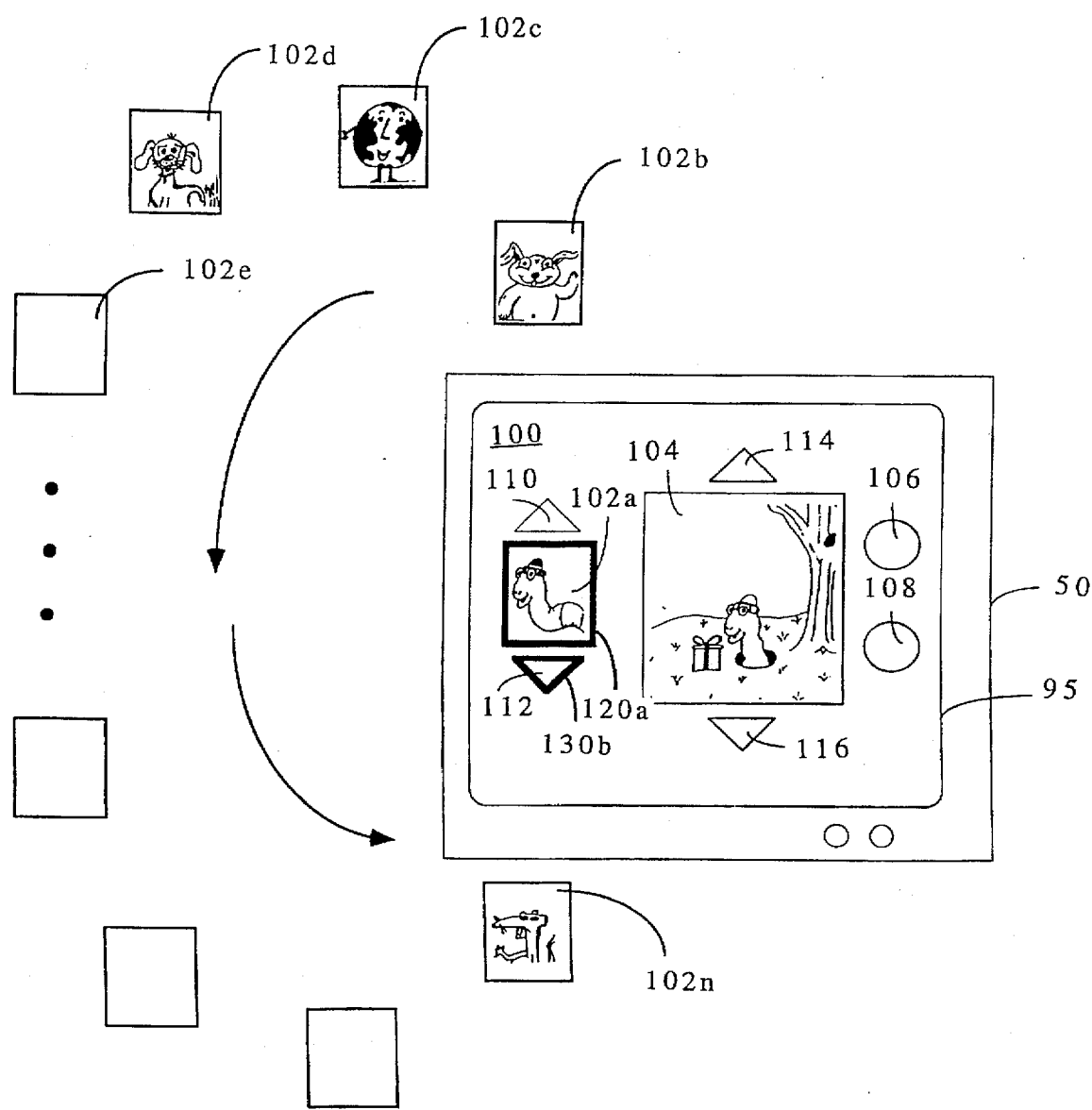

FIG. 6, consisting of FIGS. 6A–6B, shows the operation of the character window of the illustrative interface for a cartoons on demand interactive television application.

Figure 7A:
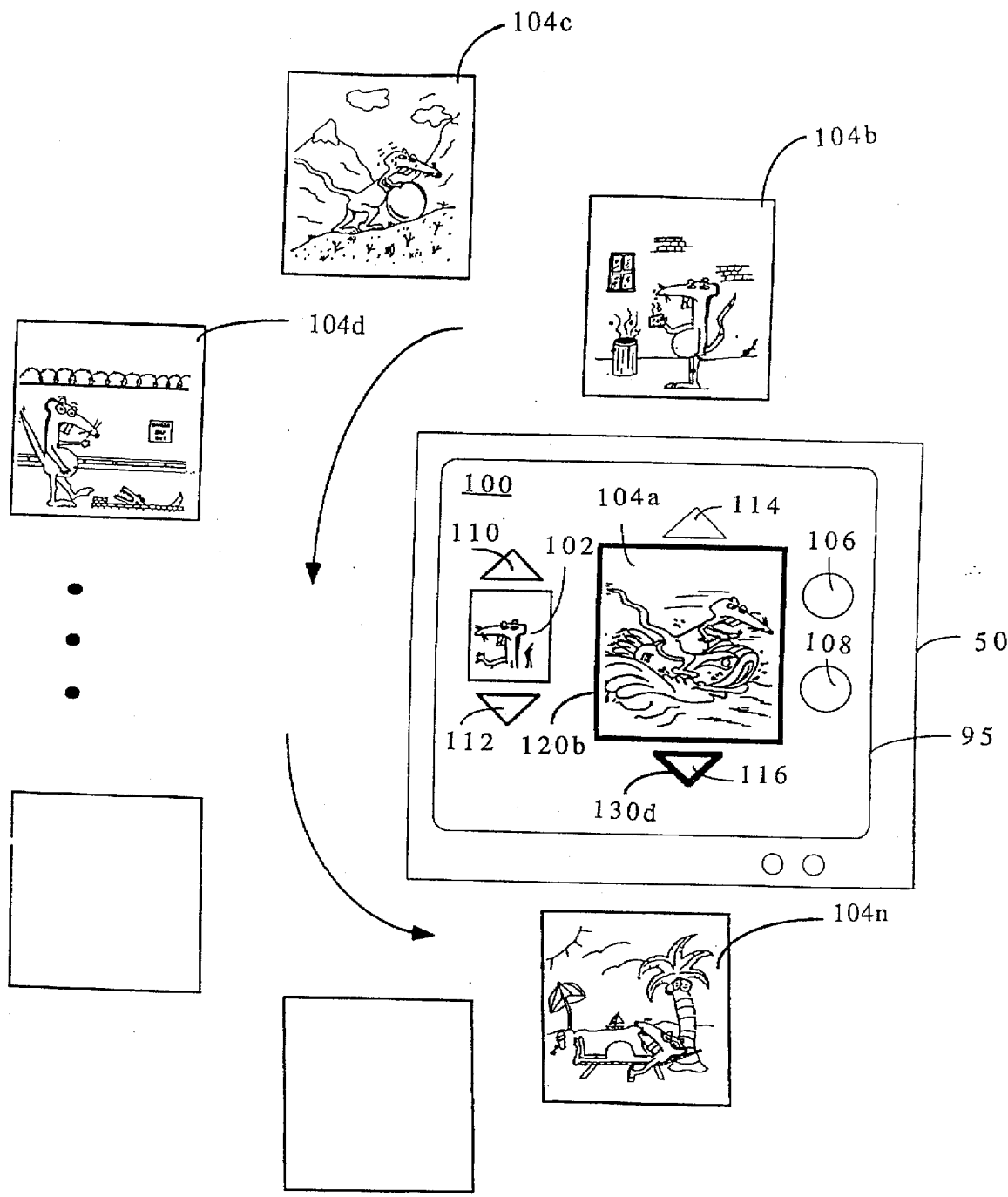
Figure 7B:
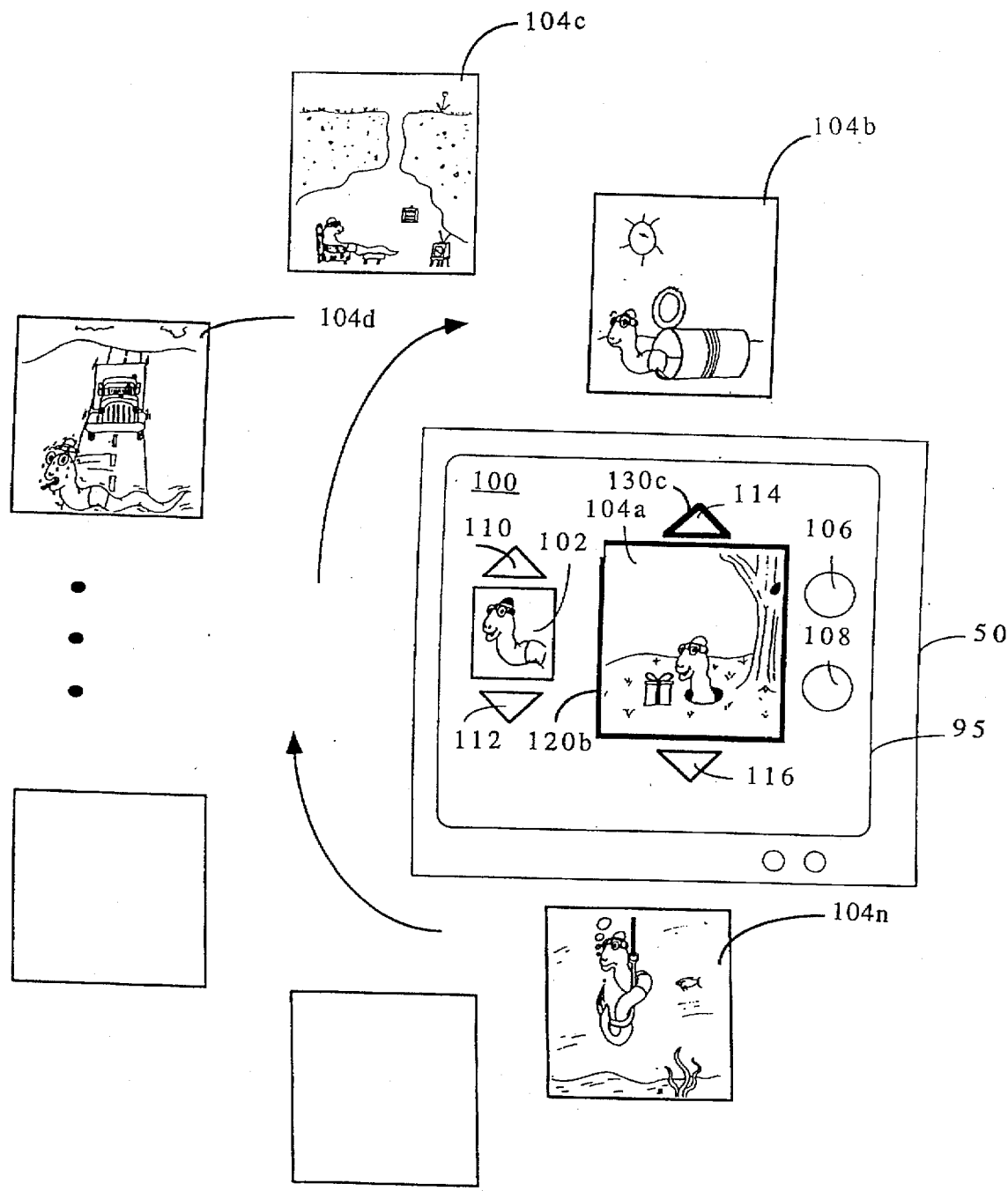

FIG. 7, consisting of FIGS. 7A–7B, shows the operation of the episode window of the illustrative interface for a cartoons on demand interactive television application.

Figure 8:
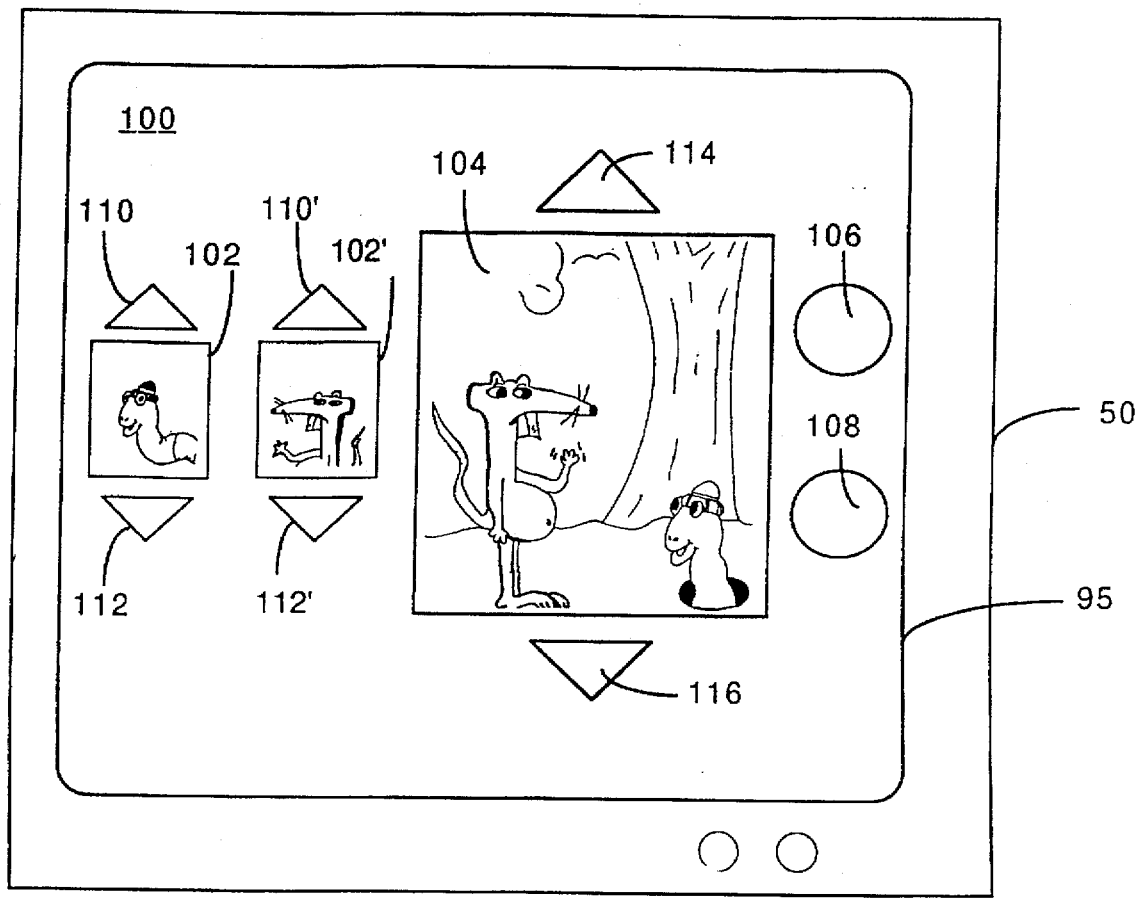

FIG. 8 is a diagram showing an alternative illustrative interface for a cartoons on demand interactive television application.

Figure 9:
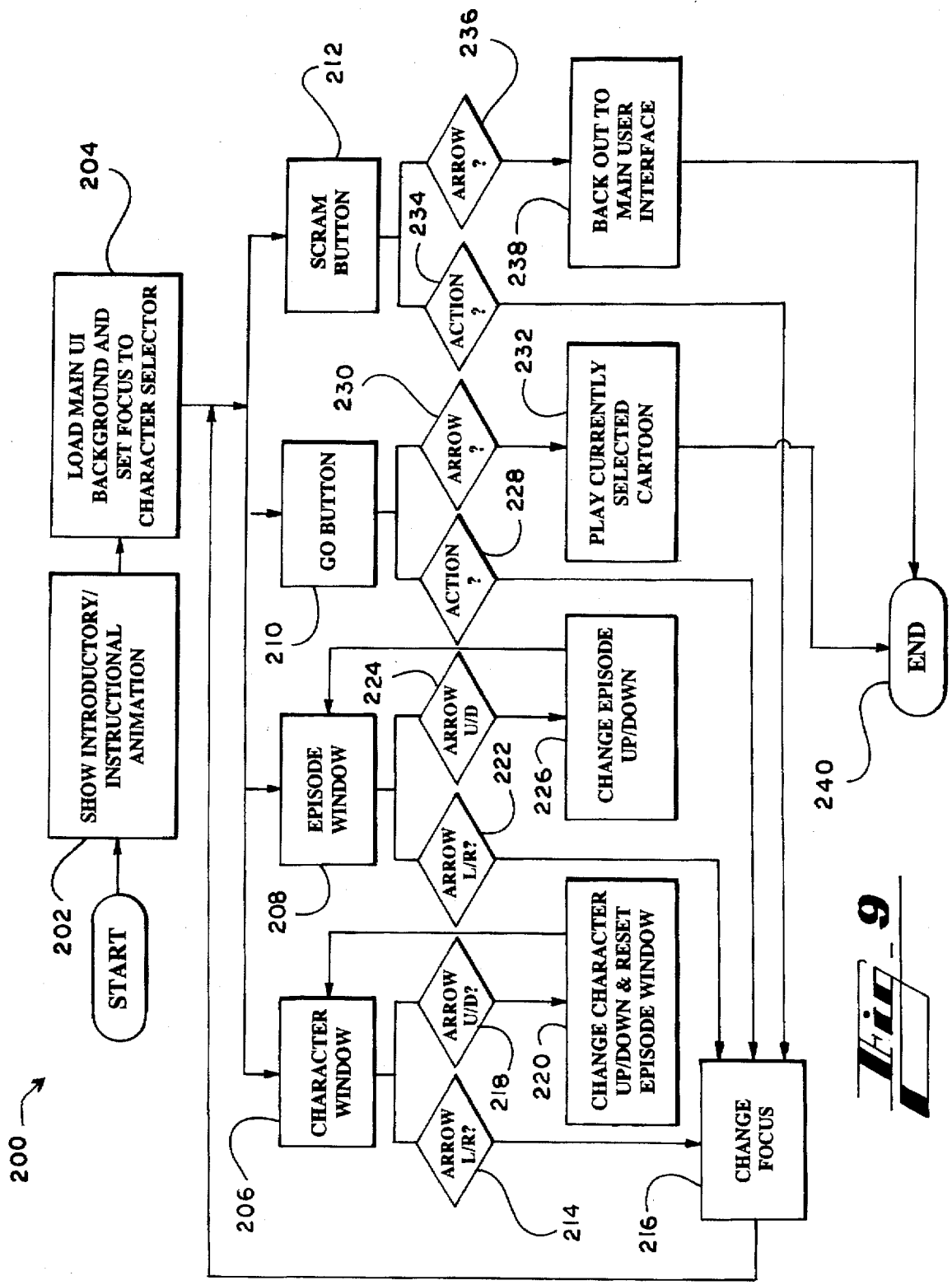

FIG. 9 is a logical flow diagram showing the steps of a computer-implemented process for the illustrative interface for a cartoons on demand interactive television application.

FIG. 10 is a table illustrating a database used to implement the character window of the illustrative interface.

FIG. 11 is a table illustrating a database used to implement the episode window of the illustrative interface.

DETAILED DESCRIPTION OF THE PREFERRED EMBODIMENTS

The preferred embodiments of the present invention are directed to a graphical viewer interface for an interactive network system that can deliver a variety of services, including entertainment, information, and transaction services, to consumers via an interactive broad band network. This user interface, which is typically presented as a graphical viewer interface via an output device, such as a television screen or display monitor, can include one or more "control items" or images representing various control functions associated with the operation of the interactive network. For example, the viewer interface can include control items representing functions for controlling a display of available program options for interactive network services. The inventive system also provides a system for "highlighting" (i.e., focusing) the currently selected control item. Moreover, the inventive system provides a system for using pictorial images and sound cues in association with control and focus items to convey information to the viewer regarding the operation of the interface and the content of the items available for selection. The innovative solution provided by this system addresses the requirements of limited display "real estate" for displaying such control images, the limited amount of information a user might have regarding the operation of the interface and the content of the items available for selection, and the dynamic nature of programming information presented by the interactive network system.

Although the preferred embodiment will be generally described with respect to a particular interactive network service—a cartoons on demand application for an interactive television system—those skilled in the art will recognize that the present invention also can be used to support the delivery of other forms of programming information, including movies on demand, music on demand, radio, broadcast print, audio, games, computer software, including program modules such as application programs and operating systems, and other combinations of audio, video and/or computer software.

Likewise, those skilled in the art will also appreciate that the present invention can be extended to the general purpose computing environment. Specifically, the present invention can support user interfaces for conveying control information on general purpose computer systems, such as desktop computers, portable computers, and handheld computers, including personal digital administrators. It is noted that an interface according to the present invention need not rely on visual images, but may operate entirely in response to audio or other sensory communication methods.

The detailed description which follows is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Interactive Television Operating Environment

Figure 1:
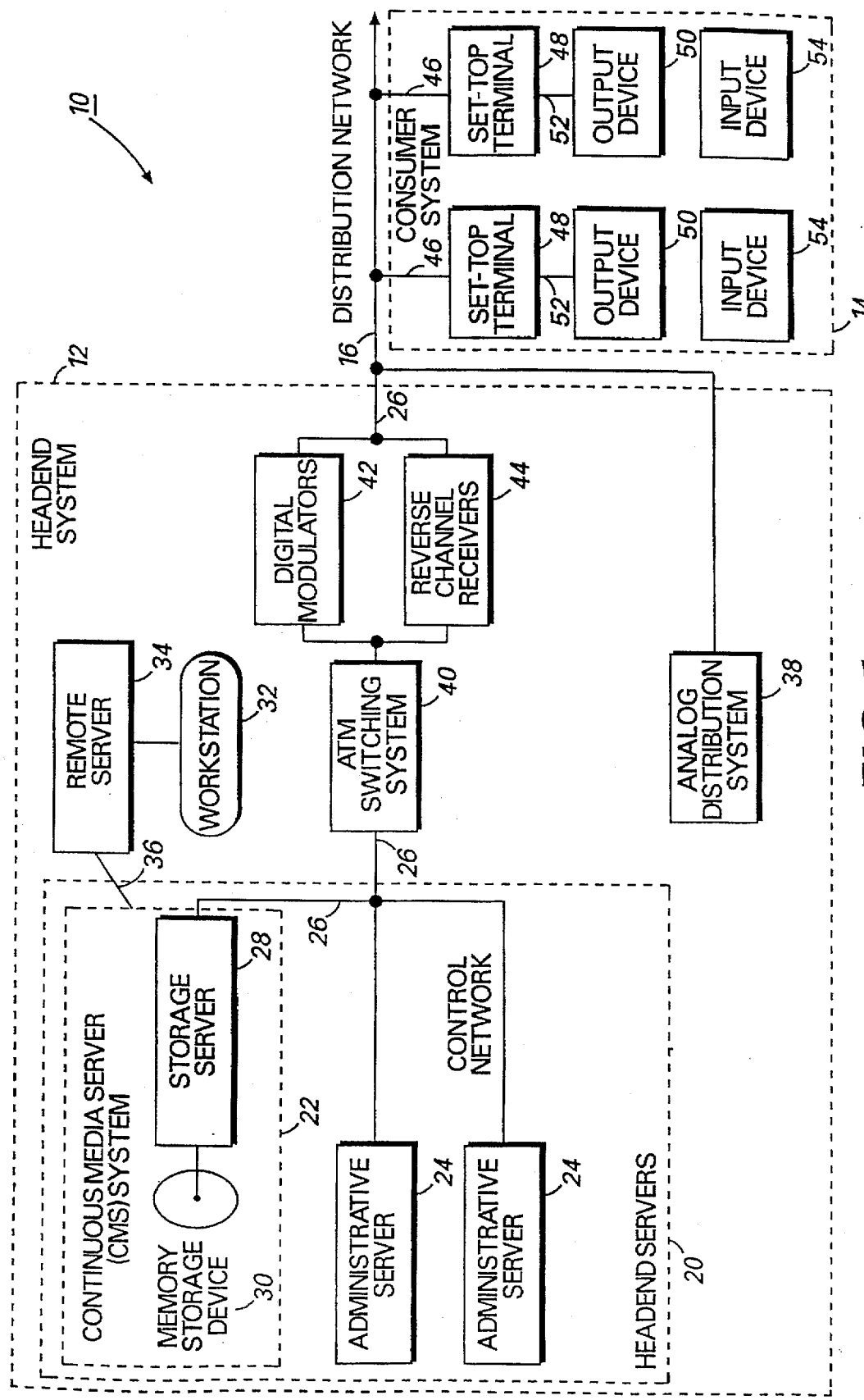
FIG. 1 is a diagram of the preferred environment of the present invention.

Turning now to the drawings, in which like numerals indicate like elements throughout the several figures, FIG. 1 illustrates the operating environment for an interactive network system. Referring to FIG. 1, the interactive network system 10 includes a headend system 12 for delivering programming information to and receiving instructions from a consumer system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 can include a world-wide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data. On-demand access of digitized data is a particularly desirable characteristic of the CMS system 22 if the interactive network supports the delivery of video on demand (VOD) such as movies on demand (MOD) and cartoons on demand (COD) services. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, data object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. Also, administrative servers 24 can be used for data object storage to support network services, such as character-based data associated with VOD services. These data object storage-type servers can support the distribution of video and audio streams by the CMS system 22, and can be implemented as SQL (Structured Query Language) servers.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system 14 and one or more upstream channels for carrying transmissions from the consumer system to the headend system. This bi-directional communications network supports delivery of programming information via the headend system 12 to each consumer, and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the o programming information delivered over the distribution network 16 typically comprises both video and audio signals. Programming information can be delivered in digital format, analog format, or a combination of both analog and digital formats. For the preferred embodiment, television-related programming is delivered as a stream of digital video and/or audio signals in a compressed digital data stream, including conventional compression schemes, such as MPEG-1 and MPEG-2. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices, such as digital modulators 42 and reverse channel receivers 44. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal or box 48 located at the consumer's location. This combination of the drop cable 46 and the set-top terminal 48 operates as a "tap" into the distribution network 16, and allows the consumer to (1) receive program modules and programming information distributed by the headend system 12, and to (2) transmit requests or instructions to the headend system 12. For example, the set-top terminal 48 can accept and convert signals carrying programming information to a format compatible for presentation by an output device 50, such as a television or a computer system. This output device 50, which can connected to the set-top terminal via a conductive path 52 such as coaxial cable, preferably includes a receiver and a display or monitor for receiving and displaying programs and program-related information.

Those skilled in the art will understand that the output device 50 can be implemented as a combination of separate components, such as a receiver and a monitor, or as a single component, such as a conventional television or a general purpose computer system. However, it will be further understood that the output device 50 is not limited to a conventional television or computer display, but can be implemented by other well known mechanisms for presenting information to a user.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive network 10. The input device 54 can be implemented as one or more devices for inputting data, including a handheld control, a keyboard, a mouse device, a game control, a joystick, a pen or stylus, a trackball, a track pad, or other data input devices.

For the preferred embodiment, the input device 54 is implemented as a handheld remote control capable of transmitting infrared signals carrying commands for controlling the operation of the set-top terminal 48. The remote control can include a directional thumbpad or keypad having distinct keys for allowing the user to issue directional commands (up, down, left, right) and keys for issuing commands to control relative changes in volume or channel (increase or decrease), as well as absolute changes to channel value. The preferred remote control and its functions are more fully described with respect to FIG. 3.

Set-Top Terminal

Figure 2:
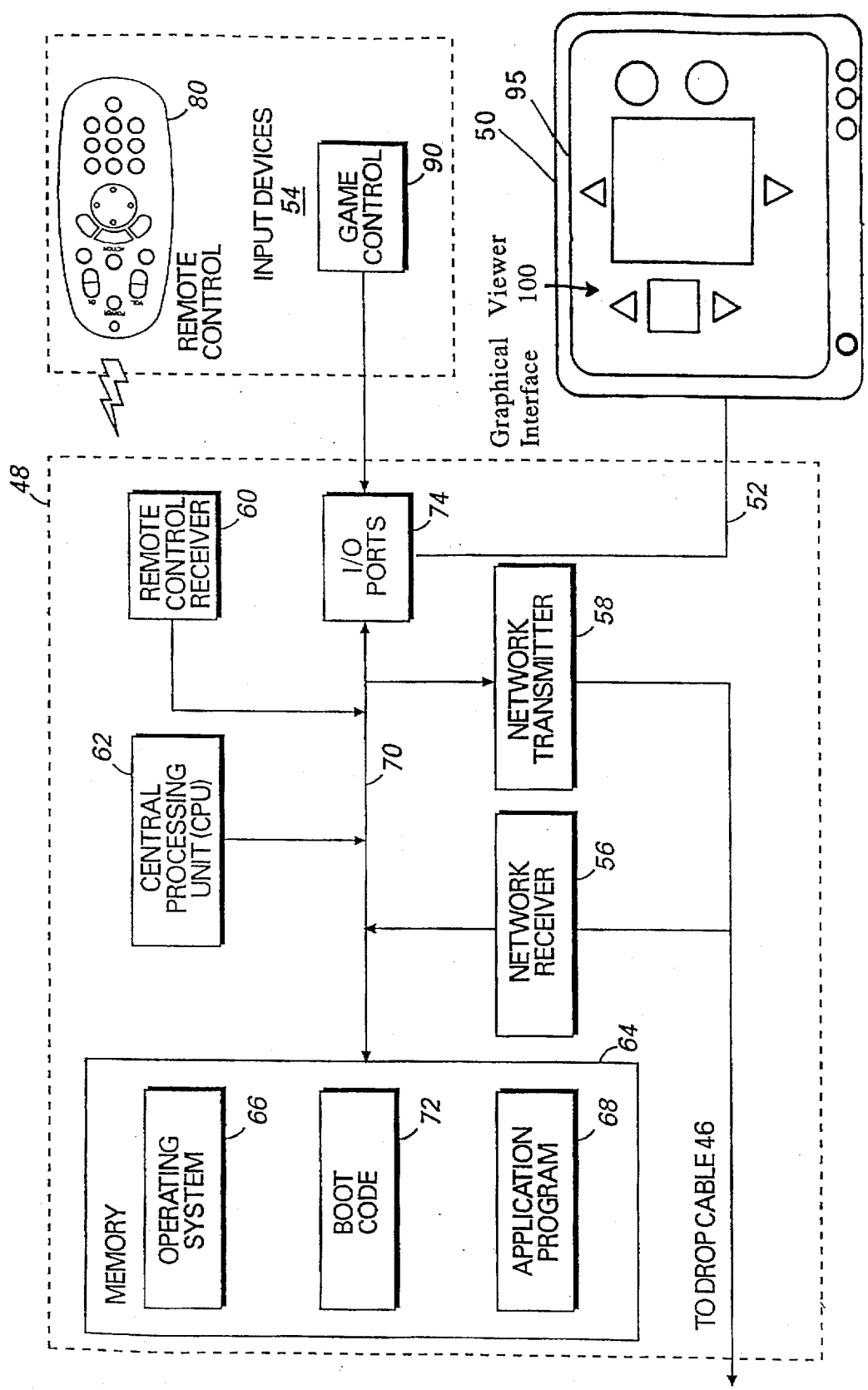
FIG. 2 is a diagram illustrating the components of a set-top terminal utilized in conjunction with the present invention.

FIG. 2 illustrate the basic components of the set-top terminal 48. The primary components for the set-top terminal 48 include a network receiver 56, a network transmitter 58, a remote control receiver 60, a central processing unit (CPU) 62, and memory 64. These components are connected by a system bus 70, which can carry control, address, and data signals.

The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television.

The network transmitter 58 transmits requests for programming information and related instructions for processing by the headend system 12.

The network receiver 56 and the network transmitter 58 are connected to the distribution network 16 via the drop cable 46.

The remote control receiver 60, which is preferably implemented as an infrared receiving device, decodes signals carrying the commands issued by the input device 54, such as a remote control unit 80.

The CPU 62, which is connected to the network receiver and transmitter 56 and 58, as well as to the remote control receiver 60, controls the operations of the set-top terminal 48 and supports the rendering of graphical images of the user interface. The CPU 62 is typically implemented by at least one single chip processor, such as the model 80486 or the PENTIUM microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more single-chip microprocessors to support the presentation of a graphics-intensive user interface. For example, a microprocessor may be dedicated to control operations associated with the bi-directional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include an operating system 66 and one or more application programs 68. The memory 64 can be implemented as a combination of dynamic memory, such as random access memory (RAM), and static memory, such as read only memory (ROM). The memory 64 also can include a mass storage data device, such as a hard disk drive or a compact disk (CD-ROM) drive.

The operating system 66 comprises a set of computer programs that control the internal functions of the set-top terminal 48 and support the execution of other program modules, including an application program 68. The preferred operating system 66 supports a graphics-based presentation of program-related information, including control items that visually represent control functions of the operating system and other program modules. As previously defined, a control item is a visual image that can be manipulated by the user to perform an operation supported by the underlying control object associated with this control item. The operating system 66 (and application programs 68) can receive and interpret input data supplied by the input device 54, as received by the remote control receiver 60. As will be described in more detail below with respect to FIG. 4, a user can "select" and "launch" control items by the use of the input device 54.

For the preferred set-top terminal 48, the memory 64 includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies upon data storage mechanisms located at the headend system 12 rather than within the set-top terminal 48 itself.

The set-top terminal 48 can be connected to a peripheral device via input/output (I/O) ports 74. The I/O ports 74 supports the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

It will be appreciated that the remote control 80 is not intended for high-action game use; instead, its general purpose is single-viewer, day-to-day usage. For games, a game control 90, such as wired or wireless game controllers, is supported by the set-top terminal 48. Other types of input devices 54 supported by the preferred embodiment can include a mouse and a keyboard. For example, a keyboard can be used to support electronic mail, text-based searching, and other character-based applications.

Still referring to FIG. 2, the user typically observes the preferred output device 50, specifically a display screen 95 of a television set or a monitor, to receive and to control the programming information of the interactive network system 10. The user interface for the interactive network system 10 is preferably implemented as a graphical viewer interface 100 displayed on the display screen 95. A viewer can manipulate items displayed by the graphical viewer interface 100, such as control and focus items, by transmitting commands to the set-top terminal 48 via the input device 54, preferably the handheld remote control 80.

Remote Control Unit

Figure 3:
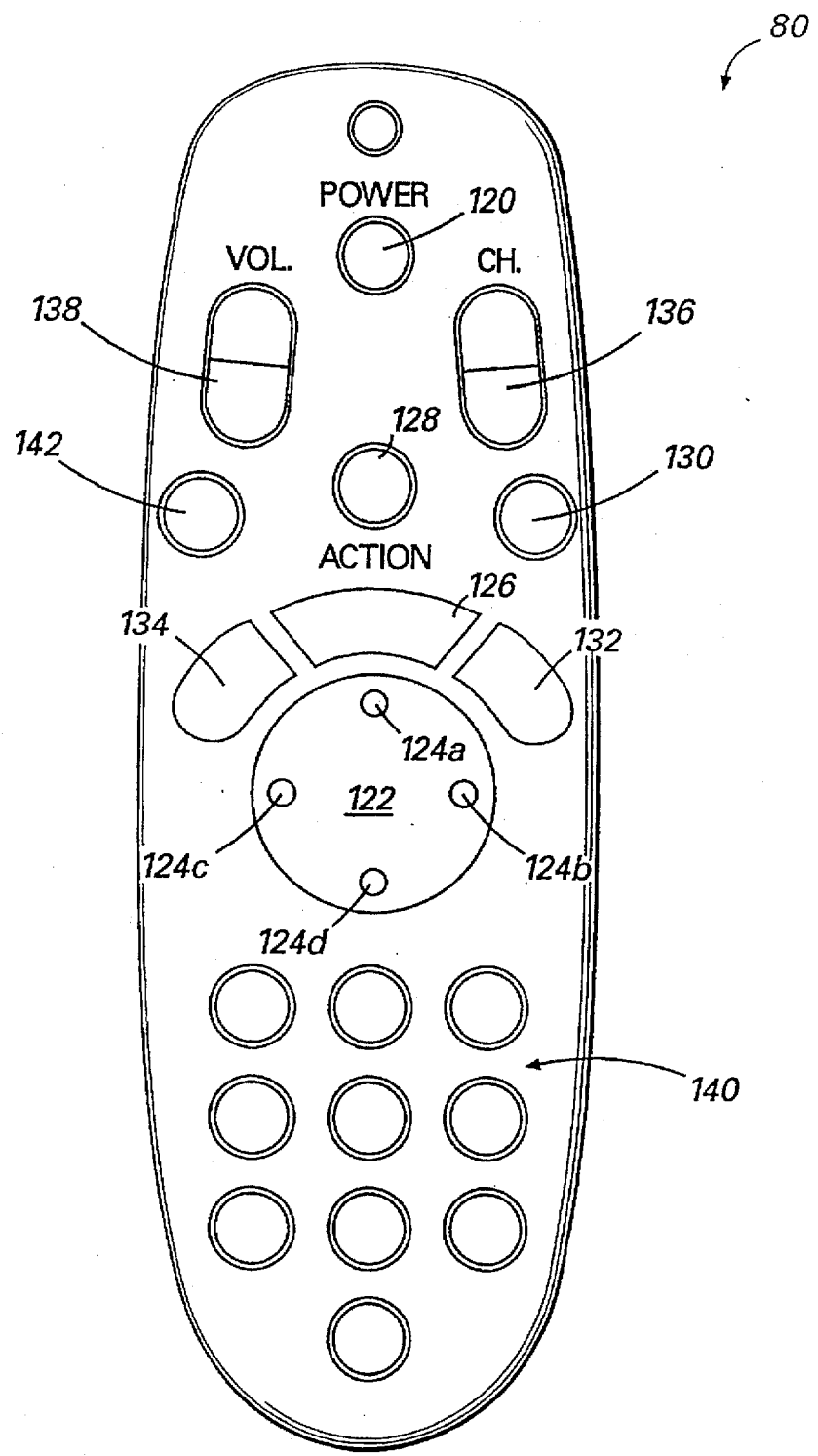
FIG. 3 is a front elevational view of an input device for controlling the operation of the preferred embodiment of the present invention.

To change the selection of control items presented by the graphical viewer interface 100, as well as to operate the control functions represented by control items, the user can use the remote control 80 to send command signals to the set-top terminal 48 via an infrared communications link. FIG. 3 shows a front view of a preferred input device for the interactive network system 10, the remote control 80. A viewer can manipulate the graphical viewer interface 100 by using the input device to make and communicate selections to the interactive network system 10. The primary input device is the remote control 80, which is the viewer's physical interface to the services offered by the interactive network system 10. The top face section of the remote control 80 includes numerous keys or buttons that allow the user to input commands for functions of the set-top terminal 48 and/or the output device 50.

For example, the preferred remote control 80 includes keys that are specifically related to preferred interactive system. A thumbpad 122, also described as a directional keypad, can be manipulated by a viewer's thumb used to maneuver a pointer, such as a cursor, or a focus item, around the graphical viewer interface 100. The thumbpad 122 includes navigation keys 124a–d for inputting directional commands. The thumbpad 122 is preferably implemented as a rocker-type switch which can operated in at least four distinct positions, as represented by the navigation keys 124a–d. Each navigation key 124a–d represents a navigation direction along the primary compass points. Upon depressing the one of the navigation keys 124a–d, the remote control 80 sends a directional command containing an instruction to move a cursor or a focus item from its present position on the graphical viewer interface 100 to a desired position consistent with the direction represented by the selected navigation key.

The remote control unit 80 also includes a variety of keys or buttons that are common to remote control units for use with conventional television sets. These include a power key 120, a channel selector key 136, a volume selector key 138, a 10-digit numeric keypad 140, and a mute key 142. The power key 120 can be used to control the operating state of the output device 50 and the set-top terminal 48 by controlling the distribution of electrical power to these units. The channel selector key 136 allows the user to vary the channel selection of the set-top terminal 48. The volume selector key 138 allows the user to increase or to decrease the volume level of the output device 50. The numeric pad 140 includes number keys for inputting the digits 0–9. The mute key 142 can be used by the viewer to turn-off the audio of a program module presented by the output device 50.

Additional control functions can also be supported by the preferred remote control 80, such as a TV/VCR switch, a "jump to last channel" switch, and "transport controls" including play, stop, pause, fast forward, and rewind. Thus, it will be understood that the control functions supported by the remote control 80 are application dependent and, consequently, this input device is not limited to the control functions and associated commands described with respect to FIG. 3.

Viewer Navigation

Referring to FIGS. 1 and 2, when a user first powers-up a set-top terminal 48, the terminal contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as the remote control 80. In this stand-by mode, the set-top terminal 48 can communicate with the headend system 12 and can respond to administrative requests transmitted by the headend system.

A viewer selects interactive programming information by tuning the output device 50, typically a television, to an interactive channel. For example, a viewer may tune to a children's interactive programming channel including a cartoons on demand service. A viewer selects an interactive channel by pressing the appropriate function key of the remote control 80, preferably the channel selector key 136 or the numeric pad 140. Alternatively, a channel may be selected and tuned to through viewer interaction with a facilitating service such as an electronic program guide.

Upon tuning to an interactive channel, the set-top terminal 48 changes modes and enters the active mode. In the active mode, the set-top terminal 48 communicates with the headend system 12 to process the instructions transmitted by the remote control 80. For example, the set-top terminal 48 responds to a command requesting programming information by forwarding this instruction to the headend system 12 via the drop cable 46 and the distribution network 16. The headend system 12 responds by retrieving selected programming information from the headend servers 20 and transmitting the selected programming information via the return path provided by the distribution network 16 and the drop cable 46. The set-top terminal 48 then supplies this programming information in the proper format for presentation via the graphical viewer interface 100 on the display screen 95.

Figure 4:
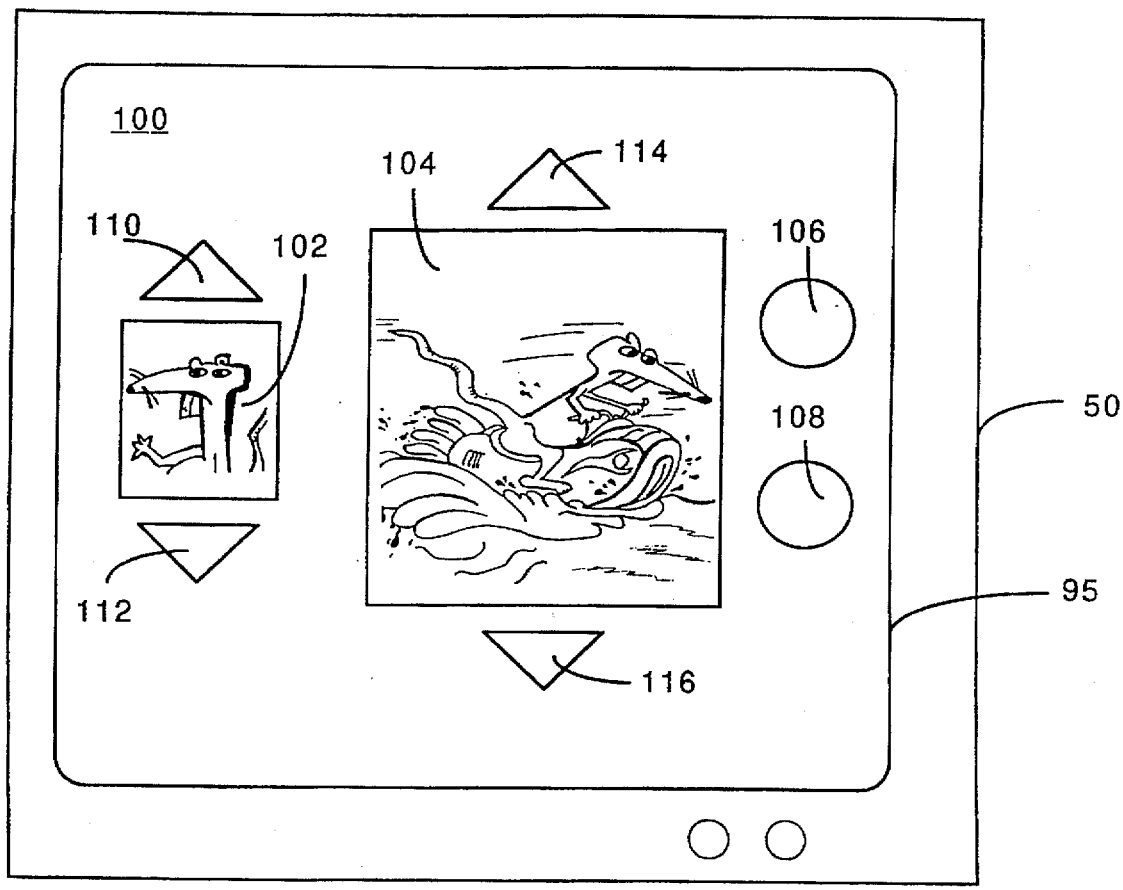
FIG. 4 is a diagram showing an illustrative interface for a cartoons on demand interactive television application.

For example, in response to a user command selecting a cartoons on demand interactive television service, the set-top terminal 48 may receive programming information from the headend 12 causing the viewer to be presented with the graphical viewer interface (GVI) 100. FIG. 4 shows the preferred screen layout for the GVI used to control the selection and ordering of a selectable option such as a cartoon episode available through a cartoons on demand service. The GVI is presented to a viewer on display 95 of output device 50. The GVI displays four selectable control items including a first window 102, a second window 104, a first button 106, and a second button 108. The GVI also displays a focus indicator in association with a particular control item to indicate to the viewer that the particular control item is "selected." A control item that is selected is enabled to receive commands from the user input device, preferably remote control 80. The GVI also displays four arrows which serve as navigation indicators arrow 110 above the first window 102, arrow 112 below the first window 102, arrow 114 above the second window 104, and arrow 116 below the second window 104. A focus indicator may be displayed in association with a particular navigation indicator to aid the viewer in understanding the operation of the interface. The viewer may navigate the focus among the various control items, order a cartoon for viewing, or end the cartoons on demand session by manipulating the remote control 80.

Referring now to FIGS. 3 and 5, the first window 102 is a "character window." The character window displays a category identification item including a pictorial image displaying one among a selectable plurality of cartoon characters. When the character window 102 is holding the focus, a focus indicator 120a such as a highlighting "focus ring" appears around the perimeter of the window, as shown in FIG. 5A. The focus may be navigated from one control item to another by depressing the left directional key 124c or the right directional key 124b on the thumbpad 122 of remote control 80. For example, the focus may be navigated from the position shown in FIG. 5A by focus ring 120a in association with character window 102, to the position shown in FIG. 5B by focus ring 120b in association with the second window 104 by depressing the right directional key. The focus may then be returned to the position shown in FIG. 5A by depressing the left directional. From the position shown in FIG. 5B, the focus may be navigated to the position shown in FIG. 5C by focus ring 120c in association with the first button 106 by depressing the right directional key. The focus may then be navigated to the position shown in FIG. 5D by focus ring 120d in association with the second button 108 by again depressing the right directional key. From the position shown in FIG. 5D, again pressing the right directional key will navigate the focus to the position shown in FIG. 5A, whereas pressing the left directional key will navigate the focus to the position shown in FIG. 5C. Thus, the viewer may "tab" the focus from one control item to another by using the left and right directional keys on the remote control.

Referring now to FIGS. 3, 5 and 6, the viewer may change the cartoon character displayed in the character window 102 by first navigating the focus to the character window, and then imparting up or down directional commands from the remote control 80 by depressing the up directional key 124a or the down directional key 124d. Thus, the viewer may select amongst the cartoon characters depicted in the windows 102a through 102n as shown in FIGS. 6A and 6B to be displayed in the character window. Depressing the up directional key causes the character displayed in the character window to be sequenced as if on a wheel or ROLO-DEX card file as shown in FIG. 6A. For example, as shown in windows 102a through 102n in FIGS. 6A and 6B, the sequence of characters displayable in the character window might include SCUZZ, DIGGER, HOPPER, ORBY, ROVER, etc. etc. As the display is sequenced in the up direction, a focus indicator such as focus ring 130a appears in association with the arrow 110 displayed above the character window as shown in FIG. 5E. The focus indicator 130a is discontinued when the viewer releases the up directional key. Similarly, depressing the down directional key causes the character displayed in the character window to be sequenced as shown on FIG. 6B. A focus indicator such as focus ring 130b appears in association with the arrow 112 displayed below the character window while the display in the character window is sequenced in the down direction as shown in FIG. 5F. Alternatively, the arrows 110 and 112 may become illuminated when holding the focus. When the viewer navigates the focus off of the character window, the character last displayed remains in the character window, and the focus indicator 120a is discontinued.

Referring now to FIGS. 3 5 and 7, the second window 104 is an "episode window." The episode window displays an option identification item including a pictorial image displaying a scene from one among a selectable plurality of cartoon episodes involving the character displayed in the character window. A different plurality of episodes is provided for each character that may be displayed in the character window. A cartoon episode typically comprises a sequence of frames, and the scene displayed is typically a single frame from the episode depicting a "key defining moment" that distinguishes that episode from all other episodes involving the same character. For example, as shown in the episode window 104a in FIG. 7A, the episode wherein SCUZZ rides a water scooter is depicted by a memorable frame from the episode with SCUZZ engaged in riding the water scooter. Similarly, the scenes depicted in selectable windows 140b through 104n each comprise a memorable frame from a particular episode cartoon featuring SCUZZ. Thus, a viewer may recall the specific episode based on the content of episode window. When the episode window 104 is holding the focus, a focus indicator such as focus ring 120b appears around the perimeter of the window, as shown in FIG. 5B.

Still referring to FIGS. 3, 5 and 7, the viewer may change the cartoon episode displayed in the episode window 104 by first navigating the focus to the episode window, and then imparting up or down directional commands from the remote control 80 by depressing the up directional key 124a or the down directional key 124d. Depressing the up directional key causes the episode displayed in the episode window to be sequenced as if on a wheel or ROLODEX card file, as shown in FIG. 7A. As the display is sequenced in the up direction, a focus indicator such as focus ring 130c appears in association with the arrow 114 displayed above the character window as shown in FIG. 5G. The focus indicator 130c is discontinued when the viewer releases the up directional key. Similarly, depressing the down directional key causes the episode displayed in the episode window to be sequenced as shown on FIG. 7B. A focus indicator 130d appears in association with the arrow 116 displayed below the character window while the display in the character window is sequenced in the down direction as shown in FIG. 5H. Alternatively, the arrows 114 and 116 may become illuminated when holding the focus. When the viewer navigates the focus off of the character window, the character last displayed remains in the character window, and the focus indicator 120b is discontinued. When the viewer navigates the focus off of the episode window, the scene last displayed remains in the episode window. When the viewer navigates the focus to the character window and then sequences through the characters available for selection, the episode window displays a stylized static image, indicating there is no episode currently selected.

Referring now to FIGS. 1, 3 and 5, the first button 106 is an "order button." The order button includes the word "order" in stylized letters displayed in association with a picture of a button. A focus ring 120c is displayed in association the order button when it is holding the focus as shown in FIG. 5C. Alternatively, the order button may become illuminated when holding the focus. The viewer orders the cartoon episode displayed in the episode window by first navigating the focus to the order button and then depressing the action key 126 on the remote control 80. The ordered episode is then transmitted from the headend system 12 the set-top terminal 48 and displayed to the viewer on the output device 50, typically a television set. Additional steps may be required before the episode is transmitted such as a step requiring the viewer to confirm the selection.

Figure 5A:
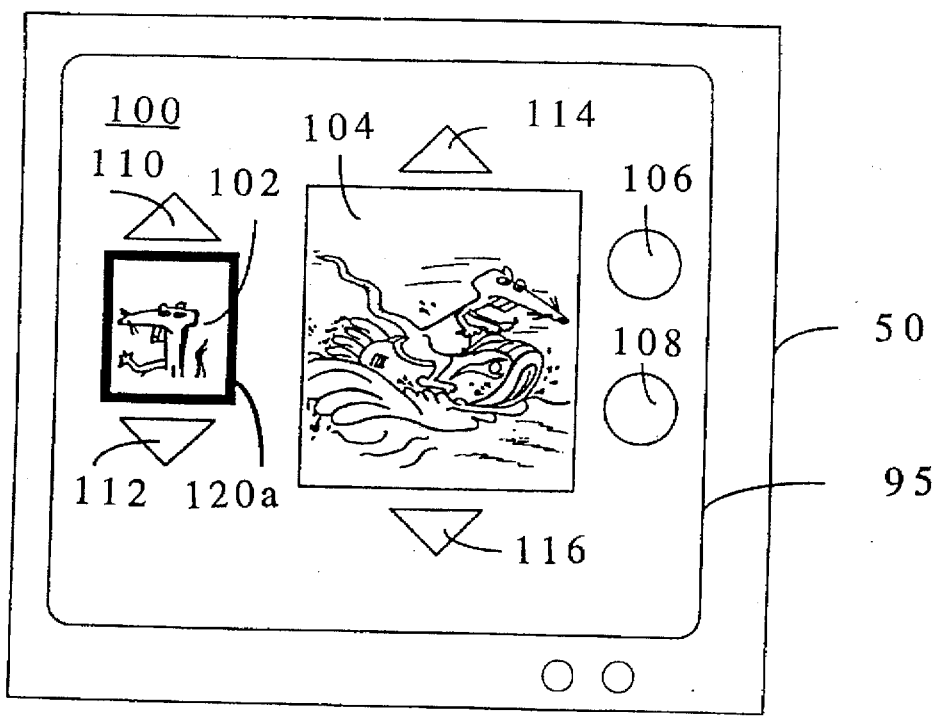
Figure 5B:
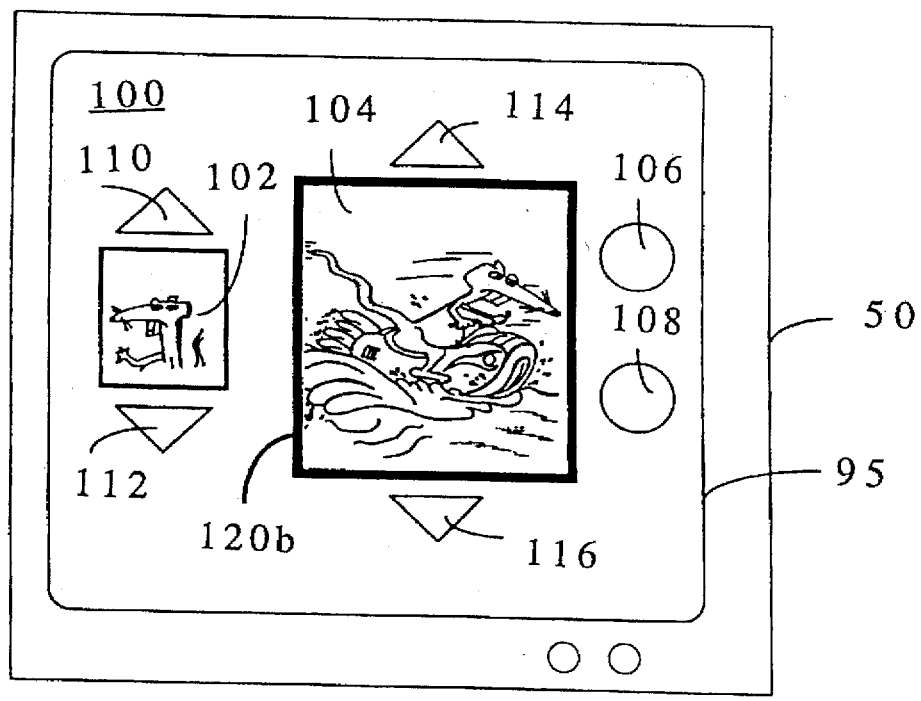

The second button 108 is a "scram button." The scram button includes the word "scram" in stylized letters displayed in association with a picture of a button. A focus ring 120d is displayed in association the scram button when it is holding the focus as shown in FIG. 5D. Alternatively, the scram button may become illuminated when holding the focus. The viewer ends the cartoons on demand application by first navigating the focus to the scram button and then depressing the action key 126 on the remote control. Executing the scram button causes the set-top terminal 48 to transmit a message to the headend system 12 that causes GVI 100 to change to a higher level interface associated with the interactive television system, such as an electronic program guide from which the viewer may select among a plurality of interactive services.

Referring now to FIG. 8, according to an alternative embodiment of the present invention, the viewer interface for the cartoons on demand application includes a second character window 102' with associated arrows 110' and 112'. In this alternative, the viewer first selects a primary cartoon character displayed in the first character window 102, and then selects a secondary cartoon character displayed in the second character window 102'. The episode window will than be operable for sequencing through episodes involving both the primary and secondary characters. For children's programming such as cartoons on demand, it is preferred that the number of episodes available for on a single character selection be no larger than seven. This feature allows for sub-categorization of the cartoons available for selection, thus limiting the number of episodes available under a particular character selection.

It is noted that the focus indicators shown in FIG. 5 are simple focus rings. Focus indicators actually used in an interactive television system may be more complex, and may include multiple visual and sound cues. The focus indicator may appear in a variety of forms external to the control item, or may appear as a change in appearance of a control item, or may appear as a combination thereof. The focus indicator may also have associated sounds such as a sliding sound followed by a "doink" sound played in association with a change in focus. Similarly, the control items displayed in FIGS. 5, 6 and 7 are simple windows and buttons. The control items actually used in an interactive television system may be more complex, and may include multiple visual and sound cues.

Computer-Implemented Process

FIG. 9 shows a logical flow diagram for a computer-implemented process 200 according to the present indictments of the present invention for controlling the control and focus items displayed by the GVI 100, and thereby selecting and ordering cartoons for viewing through a cartoons on demand interactive television service. Referring to FIGS. 1, 3, 5, 6, 7 and 9, it will be appreciated that the viewer must have selected the appropriate interactive channel, and selected the cartoons on demand service prior to the initiation of the computer-implemented process 200. Upon selection of the cartoons on demand service, computer modules supporting the computer-implemented process may be transmitted from the headend system 12 to the set-top terminal 48. Thereafter, the computer-implemented process may be executed within the headend system, within the set-top terminal, or in a combination thereof.

In the first step 202, the viewer is presented with an introductory instructional animation. This animation provides information to the viewer regarding the operation of the interactive television system and the operation of GVI 100. The viewer may exit this step by depressing the appropriate key on the remote control 80, typically the action key 126. If the viewer does not depress the action key, the computer-implemented process will move to the next step after a predetermined period of time. It is preferred that the introductory animation be short, approximately 20 seconds, and entertaining as well as informative.

In the second step 204, the cartoons on demand GVI 100 is presented to the viewer. The computer-implemented process 200 then moves to step 206 wherein the focus is set to the character window 102 as shown in FIG. 5A. When the focus is on the character window, the directional thumbpad 122 of the remote control 80 is an active feature of the remote control. Depressing the up directional key 124a moves the computer-implemented process through step 218 to step 220 wherein the characters available for selection in the character window 102 are sequenced in a first direction, as shown in FIG. 6A. Depressing the down directional key 124d moves the computer-implemented process through step 218 to step 220 wherein the characters available for selection in the character window 102 are sequenced a second direction, as shown in FIG. 6B.

If computer-implemented process is at step 206, the focus is held by the character window 102 as shown in FIG. 5A, and depressing the left directional key 124c moves the computer-implemented process through step 214 to step 216, and to step 212 wherein the focus is held by the scram button 108 as shown in FIG. 5D. Depressing the right directional key 124b moves the computer-implemented process through step 214 to step 216, and on to step 208 wherein the focus is held by the episode window 104 button as shown in FIG. 5B. The focus can be moved once again by pressing the left or right directional keys. Thus, the computer-implemented process may be moved to steps 206, 208, 210, or 212, i.e., the focus may be navigated to any of the control items 102, 104, 106, and 108, as shown in FIGS. 5A, 5B, 5C and 5D respectively, by depressing the left or right directional keys an appropriate number of times.

If the viewer manipulates the thumbpad 122 of remote control 80 such that the computer-implemented process is at step 208, the focus is held by the episode window 104 as shown in FIG. 5B. When the focus is held by the episode window, the directional thumbpad 122 of the remote control 80 an active feature of the remote control. Depressing the left or right directional keys changes the focus as previously described. Depressing the up directional key 124a moves the computer-implemented process through step 222 to step 223 wherein the characters available for selection in the episode window 104 are sequenced, as shown in FIG. 7A. Depressing the down directional key 124d moves the computer-implemented process through step 222 to step 223 wherein the characters available for selection in the episode window 104 are sequenced, as shown in FIG. 7B.

Figure 5C:
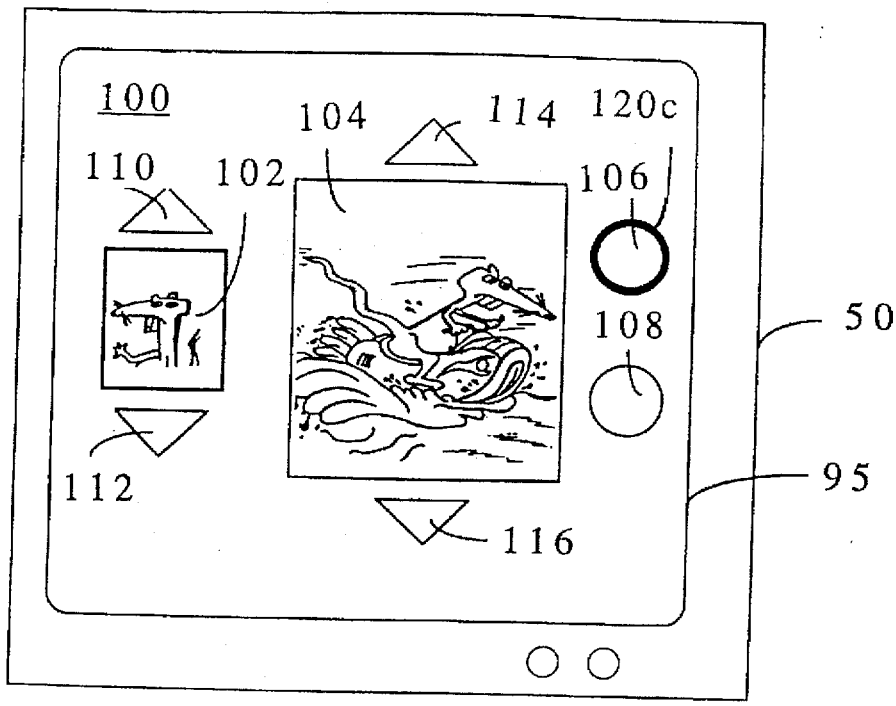
Figure 5D:
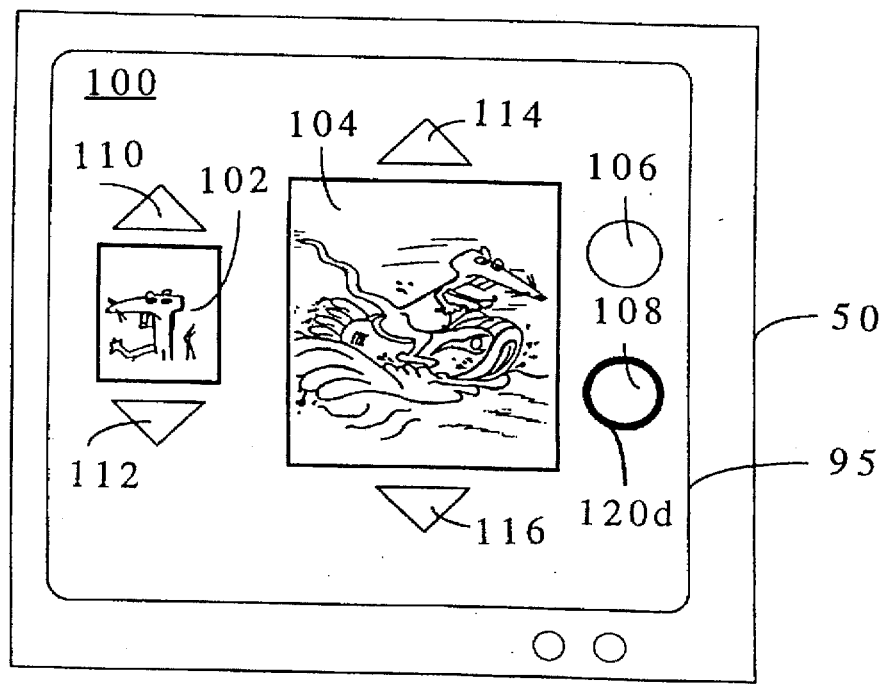
Figure 5E:
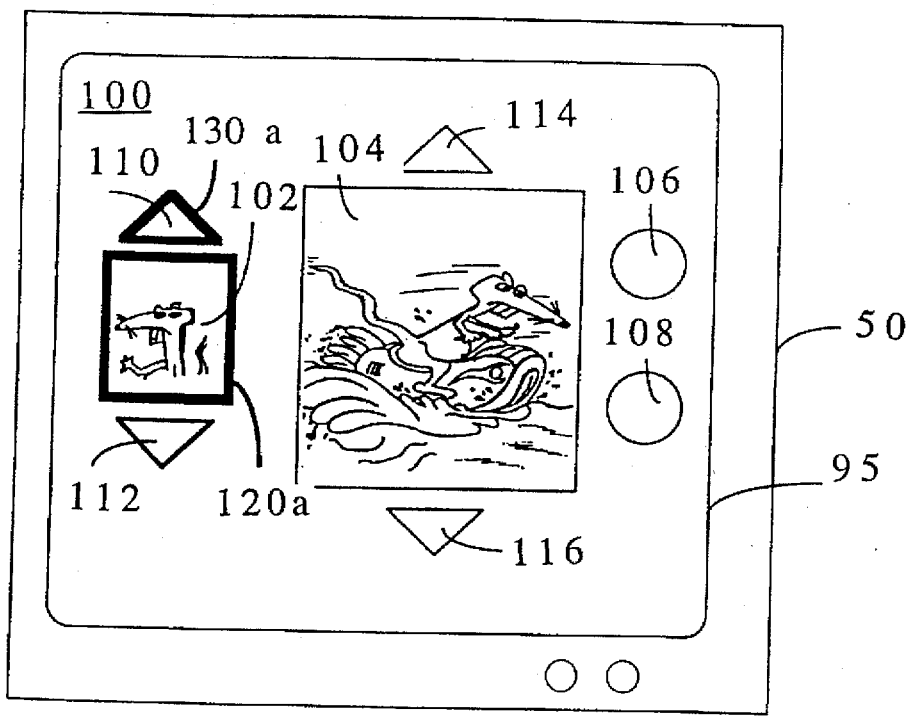
Figure 5F:
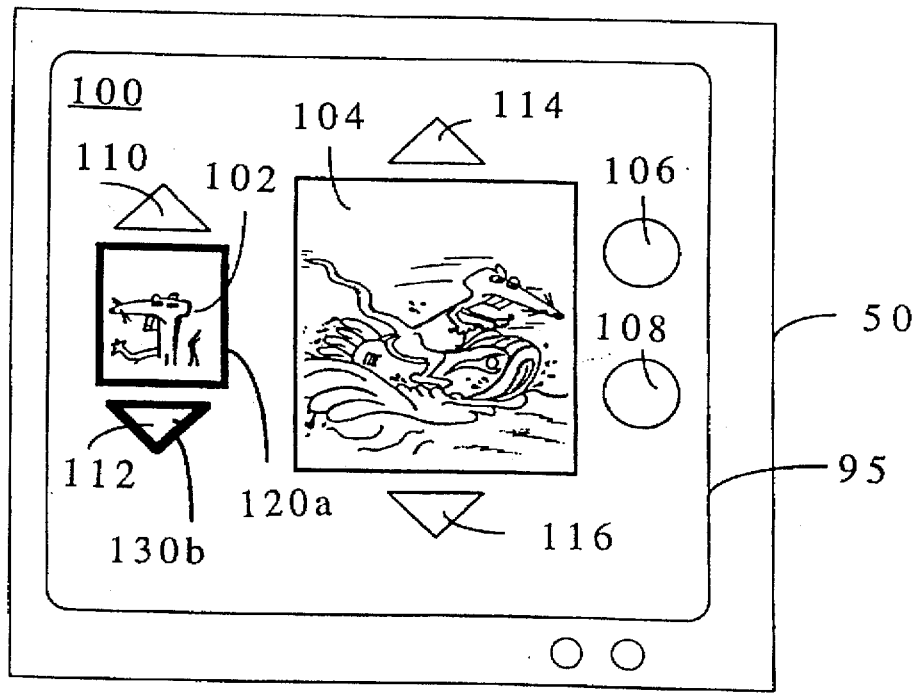
Figure 5G:
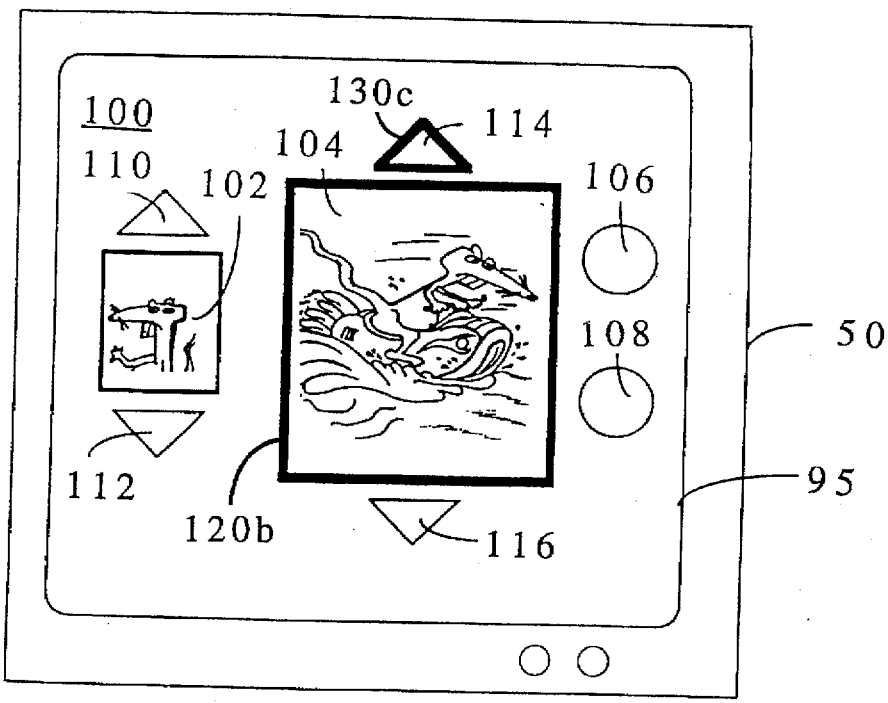
Figure 5H:
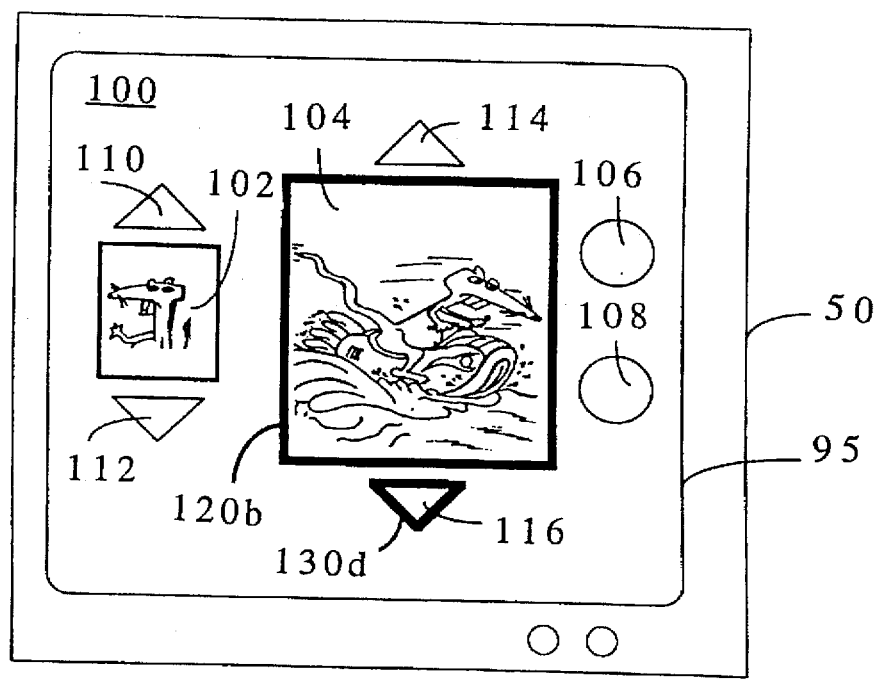

If the viewer manipulates the thumbpad 122 of remote control 80 such that the computer-implemented process is at step 210, the focus is held by the order button 106 as shown in FIG. 5C. When the focus is held by the order window, the directional thumbpad 122 and the action key 126 of the remote control 80 are active features of the remote control. Depressing the left or right directional keys changes the focus as previously described. Depressing the action key orders the cartoon depicted in the episode window 104. Additional steps may be required before the episode is transmitted such as a step requiring the viewer to confirm the selection.

If the viewer manipulates the thumbpad 122 of remote control 80 such that the computer-implemented process is at step 212, the focus is held by the scram button 108 as shown in FIG. 5D. When the focus is held by the scram button, the directional thumbpad 122 and the action key 126 of the remote control 80 are active features of the remote control. Depressing the left or right directional keys changes the focus as previously described. Depressing the action key ends the cartoons on demand session. Additional steps may be required before a cartoons on demand session is ended such as a step requiring the viewer to confirm the command to end the session.

Referring now to FIGS. 6, 9 and 10, FIG. 10 illustrates the structure of a database 300 used by computer implemented process 200 in connection with the operation of GVI 100. Database 300 comprises a plurality of elements 302a through 302n. Each element corresponds to one character that may be displayed in the character window 102. For example, the characters listed in database 300 as elements 302a through 302n in FIG. 10 correspond to the selectable characters depicted in character windows 102a through 102n as shown on FIG. 6A. Sequencing through the characters available for selection by the character window as shown in FIGS. 6A and 6B corresponds to sequencing through the elements of database 300. Each element comprises three fields, 304a, 304b, and 304c. Field 304a contains an identification number corresponding to a cartoon character that may be displayed in the character window. Field 304b contains the name of the cartoon character. Field 304c contains a pointer to a memory location containing a bit map defining the pictorial image of a cartoon character that may be displayed in the character window. When a viewer selects a character for display in the character window through operation of the remote control 80, as shown as step 206 in FIG. 9, computer implemented process 200 refers to the corresponding element of database 300 and retrieves the bit map pointed to be field 304c and causes that bit map to be displayed in association with the character window. In addition, the name of the character may be retrieved from database 300 and displayed on GVI 100, preferably near the character window.

Referring now to FIGS. 7, 9, 10 and 11, FIG. 11 illustrates the structure of a database 400 used by computer implemented process 200 in connection with the operation of GVI 100. Database 400 comprises a plurality of elements 402a through 400n. Each element corresponds to one cartoon episode that may be displayed in the episode window 104. Sequencing through the episodes available for selection by the episode window as shown in FIGS. 7A and 7B corresponds to sequencing through the elements of database 400. Each element comprises six fields, 404a, 404b, 404c, 404d, 404e, 404f. Field 404a contains an identification number corresponding to an episode that may be displayed in the episode window. Field 404b contains the name of the episode. Fields 404c, 404d and 404e each contain a reference to a character identification number, corresponding to character identification included in field 304a of database 300, as shown on FIG. 10. Field 404f contains a pointer to a memory location containing a bit map defining the pictorial image of a cartoon episode that may be displayed in the episode window. When a viewer selects a character for display in the episode window through operation of the remote control 80, as shown as step 208 in FIG. 9, computer implemented process 200 refers to database 400 and, if one of the character identification numbers contained in field 404b, 404c or 404d corresponds to the character displayed in the character window 102, retrieves the bit map pointed to be field 404f and causes that bit map to be displayed in association with the episode window. Thus, a subset of the totality of the cartoon episodes represented by database 400 can be displayed in the episode window in association with each character that can be displayed in the character window. In addition, the name of the episode may be retrieved from database 400 and displayed on GVI 100, preferably near the episode window. It will be understood by those skilled in the art that database 400 as shown in FIG. 11 is adapted allow any single cartoon episode to be selected in association with three different cartoon characters. It will be appreciated that database 400 can be easily modified to allow a different number of cartoon characters to reference the same episode.

Referring now to FIGS. 1, 2, 9, 10 and 11, it is preferred that memory 66 within the set-top terminal 48 be sufficient to contain all of the information required to implement the process illustrated by computer implemented process 200, excluding step 232, wherein an ordered cartoon is played for a viewer. Therefore, it is preferred that databases 300 and 400, along with the bit maps pointed to by them, be loaded from the headend system 12 into the set-top terminal 48 upon selection of the cartoons on demand service. Similarly, it is preferred that the control logic along with the presentation items including control items, focus items and navigation indicators associated with the operation of GVI 100 be loaded from the headend system 12 into the set-top terminal 48 upon selection of the cartoons on demand service. Thereafter, GVI 100 may be manipulated by the viewer to browse among the options, and select an episode for viewing, without a further transmission of information from the headend system to the set-top terminal. A further communication between the headend system and the set-top terminal will not occur until an episode has been selected and ordered by the viewer, as shown at step 232 in FIG. 9. At this point, the ordered episode will be transmitted from the headend to the set-top terminal for display on the viewer's television. Providing a set-top terminal with sufficient memory to allow operation in the manner described above minimizes the amount of interaction between the headend system and the set-top terminal during user interaction with GVI 100, thereby optimizing the response time of the GVI while a viewer selects and orders a cartoon episode for viewing.

In view of the foregoing, the present invention addresses the need within the interactive network environment for a viewer interface having controls that are optimized in both appearance and behavior for operation by typical users of interactive network services. The control functions of the viewer interface are easily manipulated by viewers using a handheld input device, such as a remote control. The operation of the control functions, and the content of the items available for selection, are readily understood by typical viewers based on the information presented by the viewer interface. The preferred embodiments of the present invention are further tailored to the particular needs of interactive children's programming.

It should be understood that the foregoing relates only to the preferred embodiment of the present invention, and that numerous changes may be made therein without departing from the spirit and scope of the invention as defined by the following claims.

What is claimed is:

1. In a computer system for running program modules, the computer system running a program module having control items that allow a user to control the operation of the program module, the control items being displayed for viewing by a user, a method for displaying a selected option, comprising the steps of:

displaying a screen layout comprising a first control item;

within the screen layout, displaying in association with the first control item one among a plurality of category identification items comprising a pictorial image conveying information regarding the content of a selected category of options;

within the screen layout, displaying a second control item; and within the screen layout, displaying in association with the second control item one among a plurality of option identification items comprising a pictorial image conveying information regarding the content of a selected option within the selected category of options.

2. The method of claim 1 further comprising:

within the screen layout, displaying a third control item for ordering the selected option.

3. The method of claim 2 further comprising: within the screen layout, displaying a fourth control item for ending the running program module.

4. The method of claim 2 further comprising the steps of:

within the screen layout, displaying a fourth control item for scrolling through the plurality of category identification items;

receiving a first user command associated with the fourth control item; and in response to the first user command, scrolling through the category identification items to a selected category identification item.

5. The method of claim 4 further comprising the steps of:

within the screen layout, displaying a fifth control item for scrolling through the plurality of option identification items;

receiving a second user command associated with the fifth control item; and in response to the second user command, scrolling through the option identification items to a selected option identification item.

6. The method of claim 5 further comprising the steps of:

receiving a third user command associated with the third control item; and in response to the third user command, displaying programming information associated with the selected category identification item and the selected option identification item.

7. The method of claim 1 wherein the first control item comprises a first window displayed on an output device having a display screen, the window comprising a portion of the display screen.

8. The method of claim 7 wherein the category comprises a plurality of video episodes featuring a character.

9. The method of claim 8 wherein the category identifying item comprises the character featured in the plurality of video episodes.

10. The method of claim 9 wherein the second control item comprises a window comprising a portion of the display screen.

11. The method of claim 10 wherein the selected option comprises a video episode comprising a sequence of frames.

12. The method of claim 11 wherein the option identifying item is one of the frames of the selected option.

13. In an interactive network system functionally connected with a computer for running program modules, the computer running at least one program module having control items that allow a user to control the operation of the program module, the control items being displayed for viewing by a user a method for displaying a selected option, comprising the steps of:

displaying a screen layout comprising a first control item;

within the screen layout, displaying in association with the first control item one among a plurality of category identification items comprising a pictorial image conveying information regarding the content of a selected category of options;

within the screen layout, displaying a second control item; and within the screen layout, displaying in association with the second control item one among a plurality of option identification items comprising a pictorial image conveying information regarding the content of a selected option within the selected category of options.

14. The method of claim 13 further comprising:

within the screen layout, displaying a third control item for ordering the selected option.

15. The method of claim 14 further comprising:

within the screen layout, displaying a fourth control item for ending the running program module.

16. The method of claim 14 further comprising the steps of:

within the screen layout, displaying a fourth control item for scrolling through the plurality of category identification items;

receiving a first user command associated with the fourth control item; and in response to the first user command, scrolling through the category identification items to a selected category identification item.

17. The method of claim 16 further comprising the steps of:

within the screen layout, displaying a fifth control item for scrolling through a plurality of option identification items;

receiving a second user command associated with the fifth control item; and in response to the second user command, scrolling through the option identification items to a selected option identification item.

18. The method of claim 17 further comprising the steps of:

receiving a third user command associated with the third control item; and in response to the third user command, delivering programming information associated with the selected category identification item and the selected option identification item from the interactive network to the computer.

19. The method of claim 13 wherein the first control item comprises a first window displayed on an output device having a display screen, the window comprising a portion of the display screen.

20. The method of claim 19 wherein the category comprises a plurality of video episodes featuring a character.

21. The method of claim 20 wherein the category identifying item comprises the character featured in the plurality of video episodes.

22. The method of claim 21 wherein the second control item comprises a window comprising a portion of the display screen.

23. The method of claim 22 wherein the selected option comprises a video episode comprising a sequence of frames.

24. The method of claim 23 wherein the option identifying item is one of the frames of the selected option.

* * * * *